United States Patent
Fitzpatrick et al.

(10) Patent No.: US 7,860,344 B1
(45) Date of Patent: Dec. 28, 2010

(54) TRACKING APPARATUS AND METHODS USING IMAGE PROCESSING NOISE REDUCTION

(75) Inventors: Ben G. Fitzpatrick, Marina del Rey, CA (US); Yun Wang, Marina del Rey, CA (US)

(73) Assignee: Stochastech Corporation, Los Angeles, CA (US)

(*) Notice: Subject to any disclaimer, the term of this patent is extended or adjusted under 35 U.S.C. 154(b) by 1606 days.

(21) Appl. No.: 11/123,549

(22) Filed: May 6, 2005

(51) Int. Cl.
*G06K 9/36* (2006.01)

(52) U.S. Cl. .................. 382/291; 382/228; 382/103; 345/419; 348/222.1

(58) Field of Classification Search ............... 382/291
See application file for complete search history.

(56) References Cited

U.S. PATENT DOCUMENTS

| | | | |
|---|---|---|---|
| 4,227,077 A | 10/1980 | Hopson et al. | |
| 4,671,650 A | 6/1987 | Hirzel et al. | |
| 4,739,401 A | 4/1988 | Sacks et al. | |
| 5,147,088 A | 9/1992 | Smith et al. | |
| 5,150,426 A | 9/1992 | Banh et al. | |
| 5,323,247 A * | 6/1994 | Parker et al. | 358/3.08 |
| 5,387,930 A | 2/1995 | Toh | |
| 5,489,782 A | 2/1996 | Wernikoff | |
| 5,555,317 A * | 9/1996 | Anderson | 382/159 |
| 5,613,048 A * | 3/1997 | Chen et al. | 345/419 |
| 5,640,468 A | 6/1997 | Hsu | |
| 5,647,015 A | 7/1997 | Choate et al. | |
| 5,739,920 A * | 4/1998 | Nakajima et al. | 382/240 |
| 5,850,470 A | 12/1998 | Kung et al. | |
| 5,947,413 A | 9/1999 | Mahalanobis | |
| 6,173,066 B1 | 1/2001 | Peurach et al. | |
| 6,226,409 B1 | 5/2001 | Cham et al. | |
| 6,553,131 B1 | 4/2003 | Neubauer et al. | |
| 6,795,794 B2 | 9/2004 | Anastasio et al. | |
| 6,826,316 B2 | 11/2004 | Luo et al. | |
| 6,829,384 B2 | 12/2004 | Schneiderman et al. | |
| 6,847,895 B2 | 1/2005 | Nivlet et al. | |

(Continued)

OTHER PUBLICATIONS

Fitts, J. M. "Correlation Tracking via Optimal Weighting Functions," Technical Report No. P73-240, Hughes Aircraft Co. (1973).

(Continued)

*Primary Examiner*—Brian Q Le
*Assistant Examiner*—Tsung-Yin Tsai
(74) *Attorney, Agent, or Firm*—Gazdzinski & Associates, PC

(57) ABSTRACT

Improved apparatus and methodology for image processing and object tracking that, inter alia, reduces noise. In one embodiment, the methodology is applied to moving targets such as missiles in flight, and comprises processing sequences of images that have been corrupted by one or more noise sources (e.g., sensor noise, medium noise, and/or target reflection noise). In this embodiment, a multi-dimensional image is acquired for a first time step t; the acquired image is normalized and sampled, and then segmented into target and background pixel sets. Intensity statistics of the pixel sets are determined, and a prior probability image from a previous time step smoothed. The smoothed prior image is then shifted to produce an updated prior image, and a posterior probability image calculated using the updated prior probability. Finally, the position of the target is extracted using the posterior probability image. A tracking system and controller utilizing this methodology are also disclosed.

30 Claims, 14 Drawing Sheets

U.S. PATENT DOCUMENTS

| | | |
|---|---|---|
| 6,956,511 B2 * | 10/2005 | Thomas et al. ................ 341/67 |
| 2001/0017667 A1 * | 8/2001 | Frink et al. ................ 348/458 |
| 2002/0051148 A1 * | 5/2002 | Izumi ........................ 358/1.9 |
| 2002/0194236 A1 | 12/2002 | Morris |
| 2003/0026454 A1 | 2/2003 | Lewins et al. |
| 2003/0072482 A1 | 4/2003 | Brand |
| 2003/0132366 A1 | 7/2003 | Gao et al. |
| 2003/0183765 A1 | 10/2003 | Chen et al. |
| 2004/0021852 A1 | 2/2004 | DeFlumere |
| 2004/0022438 A1 | 2/2004 | Hibbard |
| 2004/0046972 A1 * | 3/2004 | Shibao ....................... 358/1.1 |
| 2005/0025366 A1 * | 2/2005 | Jeong ........................ 382/232 |
| 2006/0147028 A1 * | 7/2006 | Hancock ................ 379/387.01 |

OTHER PUBLICATIONS

Ulick, B. L. "Overview of Acquisition, Tracking, and Pointing System Technologies," SPIE. Acquisition, Tracking and Pointing, 887 (1988) 40-63.

Van Rheeden, D. R. and R. A. Jones. "Effects of Noise on Centroid Tracker Aim Point Estimation," IEEE Trans AES. 24(2) (1988).

* cited by examiner (3 OF 3)

(2 OF 2)

US 7,860,344 B1

TRACKING APPARATUS AND METHODS USING IMAGE PROCESSING NOISE REDUCTION

GOVERNMENT INTERESTS

The invention described herein was made in the performance of work funded by Air Force Research Laboratory under contract F29601-03-0189. The government may have rights to portions of this invention.

RELATED APPLICATIONS

The present application is related to U.S. patent application Ser. No. 11/123,445 entitled "BAYESIAN METHODS FOR NOISE REDUCTION IN IMAGE PROCESSING" filed contemporaneously herewith and incorporated by reference in its entirety.

COPYRIGHT

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

The present invention relates to image processing and object tracking, and in one exemplary aspect to reducing sensor noise and scintillation noise in the optical image-based tracking of targets through media.

2. Description of Related Technology

Image data processing is useful in a broad variety of different disciplines and applications. One such application relates to the tracking of objects or targets in a random or substantially randomized media. Object tracking through random media is used, for example, in astronomical and space imaging, free space laser communication systems, automated lasik eye surgery, and laser-based weapon systems. Each of these applications requires a high degree of precision.

Inherent in object tracking is the need to accurately locate the target as a function of time. A typical tracking system might, e.g., gather a number of sequential image frames via a sensor. It is important to be able to accurately resolve these frames into regions corresponding to the target being tracked, and other regions not corresponding to the target (e.g., background). Making this more difficult are the various sources of noise which may arise in such systems, including: (i) noise generated by the sensing system itself; (ii) noise generated by variations or changes in the medium interposed between the target being tracked and the sensor (e.g., scintillation); and (iii) target reflection or interference noise (e.g., speckle).

One very common prior art approach to image location relies on direct spatial averaging of such image data, processing one frame of data at a time, in order to extract the target location or other relevant information. Such spatial averaging, however, fails to remove image contamination from the aforementioned noise sources. As a result, the extracted target locations have a lower degree of accuracy than is desired.

Two fundamental concepts are utilized under such approaches: (i) the centroid method, which uses an intensity-weighted average of the image frame to find the target location; and (ii) the correlation method, which registers the image frame against a reference frame to find the target location.

Predominantly, the "edge N-point" method is used, which is a species of the centroid method. In this method, a centroid approach is applied to the front-most N pixels of the image to find the target location.

However, despite their common use, none of the foregoing methods (including the N-point method) is well suited to use in applications with high levels of scintillation that occur in actively illuminated targets, for targets with significant speckle or scintillation of intensity, or in the presence of sensor noise.

A number of other approaches to image acquisition/processing and target tracking are disclosed in the prior art as well. For example, U.S. Pat. No. 4,227,077 to Hopson, et al. issued Oct. 7, 1980 entitled "Optical tracking system utilizing spaced-apart detector elements" discloses an optical tracking system in which an image of an object to be tracked is nutated about the image plane. Individual detector elements are arranged in a hexagonal array within the image plane such that each of the individual detector elements are located at respectively the centers of contiguous hexagonal cells. The nutation is provided, in one embodiment, by means of a tiltable mirror which rotates about an axis through the center of the mirror. The nutation of image points relative to the positions of the detector elements permit the various portions of an image to be scanned by individual detector elements. The inward spiraling of image points is utilized to provide for acquisition of the image points, and the position of an image point relative to a detector element at a given instant of time is utilized to provide elevation and azimuthal tracking data for tracking a desired object.

U.S. Pat. No. 4,671,650 to Hirzel, et al. issued Jun. 9, 1987 entitled "Apparatus and method for determining aircraft position and velocity" discloses an apparatus and method for determining aircraft position and velocity. The system includes two CCD sensors which take overlapping front and hack radiant energy images of front and back overlapping areas of the earth's surface. A signal processing unit digitizes and deblurs the data that comprise each image. The overlapping first and second front images are then processed to determine the longitudinal and lateral relative image position shifts that produce the maximum degree of correlation between them. The signal processing unit then compares the first and second back overlapping images to find the longitudinal and lateral relative image position shifts necessary to maximize the degree of correlation between those two images. Various correlation techniques, including classical correlation, differencing correlation, zero-mean correction, normalization, windowing, and parallel processing are disclosed for determining the relative image position shift signals between the two overlapping images.

U.S. Pat. No. 4,739,401 to Sacks, et al. issued Apr. 19, 1988 and entitled "Target acquisition system and method" discloses a system for identifying and tracking targets in an image scene having a cluttered background. An imaging sensor and processing subsystem provides a video image of the image scene. A size identification subsystem is intended to remove background clutter from the image by filtering the image to pass objects whose sizes are within a predetermined size range. A feature analysis subsystem analyzes the features of those objects which pass through the size identification subsystem and determines if a target is present in the image scene. A gated tracking subsystem and scene correlation and tracking subsystem track the target objects and image scene, respectively, until a target is identified. Thereafter, the tracking subsystems lock onto the target identified by the system.

U.S. Pat. No. 5,147,088 to Smith, et al. issued Sep. 15, 1992 entitled "Missile tracking systems" discloses a missile tracking system that includes a target image sensor and a missile image sensor which record image data during respective target image exposure periods and missile image exposure periods. The missile is provided with an image enhancer such as a beacon or a corner reflector illuminated from the ground, which enhances the missile image only during the missile image exposure periods.

U.S. Pat. No. 5,150,426 to Banh, et al. issued Sep. 22, 1992 entitled "Moving target detection method using two-frame subtraction and a two quadrant multiplier" discloses a method and apparatus for detecting an object of interest against a cluttered background scene. The sensor tracking the scene is movable on a platform such that each frame of the video representation of the scene is aligned, i.e., appears at the same place in sensor coordinates. A current video frame of the scene is stored in a first frame storage device and a previous video frame of the scene is stored in a second frame storage device. The frames are then subtracted by means of an invertor and a frame adder to remove most of the background clutter. The subtracted image is put through a first leakage reducing filter, preferably a minimum difference processor filter. The current video frame in the first frame storage device is put through a second leakage-reducing filter, preferably minimum difference processor filter. The outputs of the two processors are applied to a two quadrant multiplier to minimize the remaining background clutter leakage and to isolate the moving object of interest.

U.S. Pat. No. 5,387,930 to Toh issued Feb. 7, 1995 entitled "Electronic image acquisition system with image optimization by intensity entropy analysis and feedback control" discloses an image acquisition system wherein parameters associated with the system, such as any of the lens aperture, the lens focus and image intensity, are adjusted. Incoming image data is processed to determine the entropy of the image and with this information the aperture can be optimized. By determining the dynamic range of the scene the black and white levels thereof can be identified and the gain and offset applied to the image adjusted to minimize truncation distortion. Specular highlights can be detected by calculating the ratio of changes in maximum and minimum intensities between different but related images.

U.S. Pat. No. 5,489,782 to Wernikoff issued Feb. 6, 1996 entitled "Method and apparatus for quantum-limited data acquisition" discloses a methodology of forming an image from a random particle flux. Particles of the flux are detected by a discrete-cell detector having a cell size finer than conventionally used. The count data are filtered through a band-limiting filter whose bandwidth lies between a bandwidth corresponding to the detector cell size and the flux bandwidth of interest. Outliers may be flattened before filtering. Neighborhoods around each cell are evaluated to differentiate stationary regions (where neighboring data are relatively similar) from edge regions (where neighboring data are relatively dissimilar). In stationary regions, a revised estimate for a cell is computed as an average over a relatively large neighborhood around the cell. In edge regions, a revised estimate is computed as an average over a relatively small neighborhood. For cells lying in an edge region but near a stationary/edge boundary, a revised estimate is computed by extrapolating from data in the nearby stationary region.

U.S. Pat. No. 5,640,468 to Hsu issued Jun. 17, 1997 entitled "Method for identifying objects and features in an image" discloses scene segmentation and object/feature extraction in the context of self-determining and self-calibration modes. The technique uses only a single image, instead of multiple images as the input to generate segmented images. First, an image is retrieved. The image is then transformed into at least two distinct bands. Each transformed image is then projected into a color domain or a multi-level resolution setting. A segmented image is then created from all of the transformed images. The segmented image is analyzed to identify objects. Object identification is achieved by matching a segmented region against an image library. A featureless library contains full shape, partial shape and real-world images in a dual library system. Also provided is a mathematical model called a Parzen window-based statistical/neural network classifier. All images are considered three-dimensional. Laser radar based 3-D images represent a special case.

U.S. Pat. No. 5,647,015 to Choate, et al. issued Jul. 8, 1997 entitled "Method of inferring sensor attitude through multi-feature tracking" discloses a method for inferring sensor attitude information in a tracking sensor system. The method begins with storing at a first time a reference image in a memory associated with tracking sensor. Next, the method includes sensing at a second time a second image. The sensed image comprises a plurality of sensed feature locations. The method further includes determining the position of the tracking sensor at the second time relative to its position at the first time and then forming a correlation between the sensed feature locations and the predetermined feature locations as a function of the relative position. The method results in an estimation of a tracking sensor pose that is calculated as a function of the correlation. Because the method is primarily computational, implementation ostensibly requires no new hardware in a tracking sensor system other than that which may be required to provide additional computational capacity.

U.S. Pat. No. 5,850,470 to Kung, et al. issued Dec. 15, 1998 entitled "Neural network for locating and recognizing a deformable object" discloses a system for detecting and recognizing the identity of a deformable object such as a human face, within an arbitrary image scene. The system comprises an object detector implemented as a probabilistic DBNN, for determining whether the object is within the arbitrary image scene and a feature localizer also implemented as a probabilistic DBNN, for determining the position of an identifying feature on the object. A feature extractor is coupled to the feature localizer and receives coordinates sent from the feature localizer which are indicative of the position of the identifying feature and also extracts from the coordinates information relating to other features of the object, which are used to create a low resolution image of the object. A probabilistic DBNN based object recognizer for determining the identity of the object receives the low resolution image of the object inputted from the feature extractor to identify the object.

U.S. Pat. No. 5,947,413 to Mahalanobis issued Sep. 7, 1999 entitled "Correlation filters for target reacquisition in trackers" discloses a system and method for target reacquisition and aimpoint selection in missile trackers. At the start of iterations through the process, distance classifier correlation filters (DCCFs) memorize the target's signature on the first frame. This stored target signature is used in a subsequent confidence match test, so the current sub-frame target registration will be compared against the stored target registration from the first frame. If the result of the match test is true, a patch of image centered on the aimpoint is used to synthesize the sub-frame filter. A sub-frame patch (containing the target) of the present frame is selected to find the target in the next frame. A next frame search provides the location and characteristics of a peak in the next image, which indicates the target position. The DCCP shape matching processing registers the sub-frame to the lock coordinates in the next frame. This process will track most frames, and operation will repeat. However, when the similarity measure criterion is not satisfied, maximum average correlation height (MACH) filters update the aim-point and re-designate the track-point. Once the MACH filters are invoked, the process re-initializes with the new lock coordinates. The MACH filters have pre-stored images which are independent of target and scene data being processed by the system.

U.S. Pat. No. 6,173,066 to Peurach, et al. issued Jan. 9, 2001 and entitled "Pose determination and tracking by matching 3D objects to a 2D sensor" discloses a method of pose determination and tracking that ostensibly does away with conventional segmentation while taking advantage of multi-degree-of-freedom numerical fitting or match filtering as opposed to a syntactic segment or feature oriented combinatorial match. The technique may be used for image database query based on object shape descriptors by allowing the user to request images from a database or video sequence which contain a key object described by a geometric description that the user designates or supplies. The approach is also applicable to target or object acquisition and tracking based on the matching of one or a set of object shape data structures.

U.S. Pat. No. 6,226,409 to Cham, et al. issued May 1, 2001 entitled "Multiple mode probability density estimation with application to sequential markovian decision processes" discloses a probability density function for fitting a model to a complex set of data that has multiple modes, each mode representing a reasonably probable state of the model when compared with the data. Particularly, an image may require a complex sequence of analyses in order for a pattern embedded in the image to be ascertained. Computation of the probability density function of the model state involves two main stages: (1) state prediction, in which the prior probability distribution is generated from information known prior to the availability of the data, and (2) state update, in which the posterior probability distribution is formed by updating the prior distribution with information obtained from observing the data. In particular this information obtained from data observations can also be expressed as a probability density function, known as the likelihood function. The likelihood function is a multimodal (multiple peaks) function when a single data frame leads to multiple distinct measurements from which the correct measurement associated with the model cannot be distinguished. The invention analyzes a multimodal likelihood function by numerically searching the likelihood function for peaks. The numerical search proceeds by randomly sampling from the prior distribution to select a number of seed points in state-space, and then numerically finding the maxima of the likelihood function starting from each seed point. Furthermore, kernel functions are fitted to these peaks to represent the likelihood function as an analytic function. The resulting posterior distribution is also multimodal and represented using a set of kernel functions. It is computed by combining the prior distribution and the likelihood function using Bayes Rule.

U.S. Pat. No. 6,553,131 to Neubauer, et al. issued Apr. 22, 2003 entitled "License plate recognition with an intelligent camera" discloses a camera system and method for recognizing license plates. The system includes a camera adapted to independently capture a license plate image and recognize the license plate image. The camera includes a processor for managing image data and executing a license plate recognition program device. The license plate recognition program device includes a program for detecting orientation, position, illumination conditions and blurring of the image and accounting for the orientations, position, illumination conditions and blurring of the image to obtain a baseline image of the license plate. A segmenting program for segmenting characters depicted in the baseline image by employing a projection along a horizontal axis of the baseline image to identify positions of the characters. A statistical classifier is adapted for classifying the characters. The classifier recognizes the characters and returns a confidence score based on the probability of properly identifying each character. A memory is included for storing the license plate recognition program and the license plate images taken by an image capture device of the camera.

U.S. Pat. No. 6,795,794 to Anastasio, et al. issued Sep. 21, 2004 entitled "Method for determination of spatial target probability using a model of multisensory processing by the brain" discloses a method of determining spatial target probability using a model of multisensory processing by the brain includes acquiring at least two inputs from a location in a desired environment where a first target is detected, and applying the inputs to a plurality of model units in a map corresponding to a plurality of locations in the environment. A posterior probability of the first target at each of the model units is approximated, and a model unit with a highest posterior probability is found. A location in the environment corresponding to the model unit with a highest posterior probability is chosen as the location of the next target.

U.S. Pat. No. 6,829,384 to Schneiderman, et al. issued Dec. 7, 2004 entitled "Object finder for photographic images" discloses an object finder program for detecting presence of a 3D object in a 2D image containing a 2D representation of the 3D object. The object finder uses the wavelet transform of the input 2D image for object detection. A pre-selected number of view-based detectors are trained on sample images prior to performing the detection on an unknown image. These detectors then operate on the given input image and compute a quantized wavelet transform for the entire input image. The object detection then proceeds with sampling of the quantized wavelet coefficients at different image window locations on the input image and efficient look-up of pre-computed log-likelihood tables to determine object presence.

U.S. Pat. No. 6,826,316 to Luo, et al. issued Nov. 30, 2004 entitled "System and method for determining image similarity" discloses a system and method for determining image similarity. The method includes the steps of automatically providing perceptually significant features of main subject or background of a first image; automatically providing perceptually significant features of main subject or background of a second image; automatically comparing the perceptually significant features of the main subject or the background of the first image to the main subject or the background of the second image; and providing an output in response thereto. In the illustrative implementation, the features are provided by a number of belief levels, where the number of belief levels are preferably greater than two. The perceptually significant features include color, texture and/or shape. In the preferred embodiment, the main subject is indicated by a continuously valued belief map. The belief values of the main subject are determined by segmenting the image into regions of homogenous color and texture, computing at least one structure feature and at least one semantic feature for each region, and computing a belief value for all the pixels in the region using a Bayes net to combine the features.

U.S. Pat. No. 6,847,895 to Nivlet, et al. issued Jan. 25, 2005 entitled "Method for facilitating recognition of objects, notably geologic objects, by means of a discriminant analysis technique" discloses a method for facilitating recognition of objects, using a discriminant analysis technique to classify the objects into predetermined categories. A learning base comprising objects that have already been recognized and classified into predetermined categories is formed with each category being defined by variables of known statistical characteristics. A classification function using a discriminant analysis technique, which allows distribution among the categories the various objects to be classified from measurements available on a number of parameters, is constructed by reference to the learning base. This function is formed by determining the probabilities of the objects belonging to the various categories by taking account of uncertainties about the parameters as intervals of variable width. Each object is then assigned, if possible, to one or more predetermined categories according to the relative value of the probability intervals.

United States Patent Publication No. 20030072482 to Brand published Apr. 17, 2003 entitled "Modeling shape, motion, and flexion of non-rigid 3D objects in a sequence of images" discloses a method of modeling a non-rigid three-dimensional object directly from a sequence of images. A shape of the object is represented as a matrix of 3D points, and a basis of possible deformations of the object is represented as a matrix of displacements of the 3D points. The matrices of 3D points and displacements forming a model of the object. Evidence for an optical flow is determined from image intensities in a local region near each 3D point. The evidence is factored into 3D rotation, translation, and deformation coefficients of the model to track the object in the video.

United States Patent Publication No. 20030132366 Gao, et al. published Jul. 17, 2003 "Cluster-weighted modeling for media classification" discloses a probabilistic input-output system is used to classify media in printer applications. The probabilistic input-output system uses at least two input parameters to generate an output that has a joint dependency on the input parameters. The input parameters are associated with image-related measurements acquired from imaging textural features that are characteristic of the different classes (types and/or groups) of possible media. The output is a best match in a correlation between stored reference information and information that is specific to an unknown medium of interest. Cluster-weighted modeling techniques are used for generating highly accurate classification results.

United States Patent Publication No. 20030183765 to Chen, et al. published Oct. 2, 2003 entitled "Method and system for target detection using an infra-red sensor" discloses a target detection and tracking system that provides dynamic changing of the integration time (IT) for the system IR sensor within a discrete set of values to maintain sensor sensitivity. The system changes the integration time to the same or a different sensor integration time within the discrete set based on the image data output from the sensor satisfying pre-determined system parameter thresholds. The system includes an IT-related saturation prediction function allowing the system to avoid unnecessary system saturation when determining whether an IT change should be made. The tracking portion of the system provides tracking feedback allowing target objects with a low sensor signature to be detected without being obscured by nearby uninterested objects that produce system saturation.

United States Patent Publication No. 20030026454 to Lewins, et al. issued Feb. 6, 2003 entitled "Probability weighted centroid tracker" discloses a system for tracking a target that includes an image sensor mounted to a gimbal for acquiring an image, wherein the image includes a plurality of pixels representing the target and a background. The system further includes a motor for rotating the gimbal and an autotracker electrically coupled to the image sensor and the motor. The autotracker includes a probability map generator for computing a probability that each of the plurality of pixels having a particular intensity is either a portion of the target or a portion of the background, a pixel processor in communicative relation with the probability map generator for calculating a centroid of the target based upon the probabilities computed by the probability map generator, and a controller in communicative relation with the pixel processor for generating commands to the motor based upon the centroid.

United States Patent Publication No. 20040021852 to DeFlumere published Feb. 5, 2004 and entitled "Reentry vehicle interceptor with IR and variable FOV laser radar" discloses a dual mode seeker for intercepting a reentry vehicle or other target. In one embodiment, the seeker is configured with an onboard 3D ladar system coordinated with an onboard IR detection system, where both systems utilize a common aperture. The IR and ladar systems cooperate with a ground based reentry vehicle detection/tracking system for defining a primary target area coordinate and focusing the IR FOV thereon. The IR system obtains IR image data in the IR FOV. The ladar system initially transmits with a smaller laser FOV to illuminate possible targets, rapidly interrogating the IR FOV. The ladar system obtains data on each possible target to perform primary discrimination assessments. Data fusion is employed to resolve the possible targets as between decoys/clutter and a reentry vehicle. The laser FOV is expandable to the IR FOV.

United States Patent Publication No. 20040022438 to Hibbard published Feb. 5, 2004 entitled "Method and apparatus for image segmentation using Jensen-Shannon divergence and Jensen-Renyi divergence" discloses a method of approximating the boundary of an object in an image, the image being represented by a data set, the data set comprising a plurality of data elements, each data element having a data value corresponding to a feature of the image. The method comprises determining which one of a plurality of contours most closely matches the object boundary at least partially according to a divergence value for each contour, the divergence value being selected from the group consisting of Jensen-Shannon divergence and Jensen-Renyi divergence.

For additional information on other prior art approaches to object (e.g., missile) tracking, see also Fitts, J. M. "*Correlation Tracking via Optimal Weighting Functions,*" Technical Report Number P73-240, Hughes Aircraft Co. (1973); Ulick, B. L. "*Overview of Acquisition, Tracking, and Pointing System Technologies,*" SPIE. Acquisition, Tracking and Pointing, 887 (1988) 40-63; and Van Rheeden, D. R. and R. A. Jones. "*Effects of Noise on Centroid Tracker Aim Point Estimation,*" IEEE Trans AES. 24(2) (1988), each of the foregoing incorporated herein by reference in its entirety.

Despite the foregoing plethora of different approaches to object (target) location, tracking and image processing, there is still an unsatisfied need for practical and effective apparatus and methods that account for sensor-based, medium-induced, and/or reflection related noise sources. Ideally, such improved apparatus methods would be readily implemented using extant hardware and software, adaptable to both an active and passive illumination environment, and would utilize information on an inter-frame (frame-to-prior or subsequent frame) basis in order to isolate and remove unwanted noise artifact, thereby increasing the accuracy of the image (and location of the target).

SUMMARY OF THE INVENTION

The present invention satisfies the foregoing needs by providing, inter alia, improved apparatus and methods for object tracking and image processing.

In a first aspect of the invention, a method of estimating the position of a target using a sequence of images is disclosed. In one embodiment, the method comprises: acquiring a multi-dimensional image for a time step t; normalizing the image to produce a normalized image, the normalized image having an intensity within a given range; sampling the normalized image with at least one sample rate to produce a sampled image; segmenting the normalized image into target and background pixel sets; determining at least one intensity statistic of the pixel sets; smoothing a prior probability image from a previous time step; shifting the prior image to produce an updated prior image; calculating a posterior probability image using at least the updated prior probability; and extracting a position of the target for at least one time step using at least the posterior probability image.

In a second aspect of the invention; a controller apparatus adapted to estimate the position of a target using a sequence of images is disclosed. In one embodiment, the apparatus comprises: a data interface adapted to receive a plurality of image data; a digital processor in data communication with the interface; and a computer program operative to run on the processor, the program being adapted to: acquire a multi-dimensional image associated with a first time step; normalize the image to produce a normalized image having pixels each with an intensity within a given range; segment the normalized image into first and second pixel sets; determine at least one intensity statistic of the pixel sets; smooth a prior probability image from a previous time step; shift the prior image to produce an updated prior image; calculate a posterior probability image using at least the updated prior probability; and extract a position of the target for at least one time step using at least the posterior probability image.

In a third aspect of the invention, a method of creating a dynamic posterior probability that identifies at least a portion of the motion of an object within a plurality of images is disclosed. In one embodiment, the method comprises: generating the posterior probability from input image data and at least one prior probability; and smoothing the posterior; wherein the dynamic posterior will not converge to a fixed image. In one variant, the generation of the posterior probability comprises generating using Bayes' rule.

In a fourth aspect of the invention, a method of image processing is disclosed. In one embodiment, the method comprises segmenting an image having a plurality of pixels into at least first and second classes, the first class comprising pixels having intensity values greater than a first threshold value, and the second class comprising pixels not related to the target and which do not include scintillation information.

In a fifth aspect of the invention, a method of image processing in an image processing system used for tracking an object disposed in a medium is disclosed. In one embodiment, the method comprises: segmenting an image having a plurality of pixels into at least first and second classes; and estimating and updating at least one statistic of each of the classes; wherein no prior knowledge of any environmental property relating to the object or medium is required to perform the acts of estimating or updating.

In a sixth aspect of the invention, a method of object tracking using an image-based tracking system having at least one sensor and an actuator is disclosed. In one embodiment, the method comprises: obtaining one or more images containing at least a portion of the object; estimating a smoothing parameter associated with the images; and tracking the object based at least in part on the smoothing parameter; wherein the act of estimating comprises: providing at least one position of the actuator; providing at least one prior estimated error; estimating the smoothing parameter based at least in part on the at least one position and prior estimated error.

In a seventh aspect of the invention, a method of tracking an object using a plurality of images is disclosed. In one embodiment, the method comprises estimating at least one positional error value (tilt) based at least in part on a smoothed posterior probability. In one variant, the estimation comprises performing an iterated centroid and median searching method.

In an eighth aspect of the invention, a method of tracking an object using images is disclosed. In one embodiment, the method comprises: generating a prior probability from an image obtained during a first time step, the prior probability being used in a subsequent time step, the generating comprising correcting a smoothed posterior probability by at least shifting the smoothed posterior probability to anticipate an image obtained during a subsequent time step.

In a ninth aspect of the invention, a method of processing image data relating to an object is disclosed. In one embodiment, the method comprises: obtaining the image data, the data further comprising scintillation noise; and scaling the input data use a non-uniform scale so that the scintillation noise present therein can be identified.

In a tenth aspect of the invention, a storage apparatus is disclosed. In one embodiment, the apparatus comprises a computer readable medium having a plurality of data stored thereon, the plurality of data comprising at least one computer program, the at least one computer program being adapted to process image data and comprising: a first module configured to scale the image data obtained at a first time; a second module configured to calculate image statistics based at least in part on the data; a third module configured to calculate the smoothing parameter based at least in part on the data; a fourth module configured to calculate a posterior probability based at least in part on the data; and a fifth module configured to determine at least one error based at least in part on the posterior probability.

BRIEF DESCRIPTION OF THE DRAWINGS

The features, objectives, and advantages of the invention will become more apparent from the detailed description set forth below when taken in conjunction with the drawings, wherein.

DETAILED DESCRIPTION OF THE INVENTION

Figure 1:
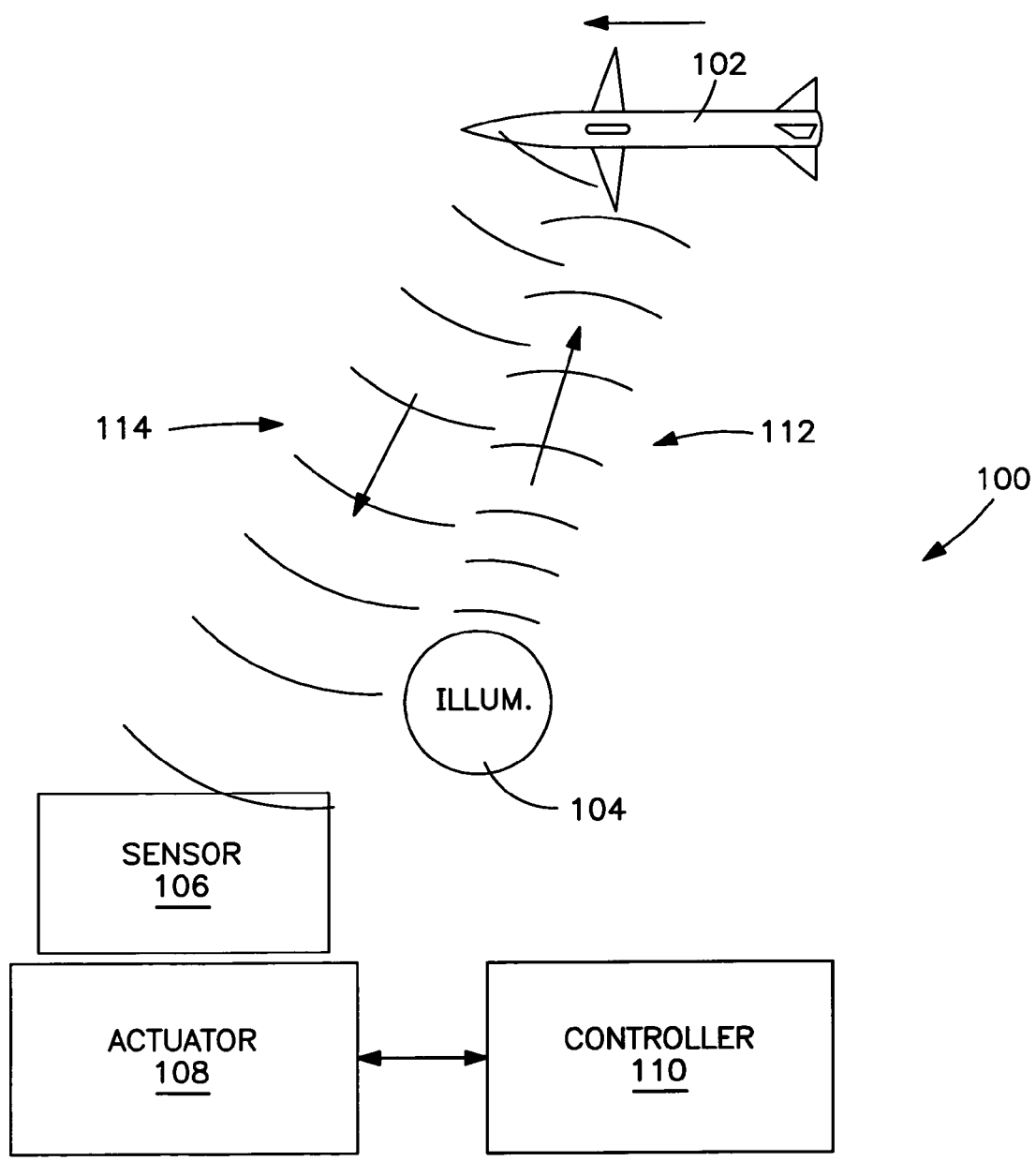
FIG. 1 is a functional block diagram of one embodiment of a tracking system according to the present invention.

Reference is now made to the drawings wherein like numerals refer to like parts throughout.

As used herein, the term "computer" includes, but is not limited to, personal computers (PCs) and minicomputers, whether desktop, laptop, or otherwise, personal digital assistants (PDAs) such as the Apple Newton®, "Palm®" family of devices, handheld computers, personal communicators, J2ME equipped devices, cellular telephones, "smartphones" or literally any other device capable of interchanging data with another device or network.

The term "processor" is meant to include any integrated circuit or other electronic device (or collection of devices) capable of performing an operation on at least one instruction including, without limitation, reduced instruction set core (RISC) processors, CISC microprocessors, microcontroller units (MCUs), CISC-based central processing units (CPUs), Field Programmable Gate Array (FPGA), Application Specific Integrated Circuits (ASIC), and digital signal processors (DSPs). The hardware of such devices may be integrated onto a single substrate (e.g., silicon "die"), or distributed among two or more substrates. Furthermore, various functional aspects of the processor may be implemented solely as software or firmware associated with the processor.

As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "computer program", "routine," and "subroutine" are substantially synonymous, with "computer program" being used typically (but not exclusively) to describe collections or groups of the latter two elements. Such programs and routines/subroutines may be rendered in any language including, without limitation, C, C++, Fortran, COBOL, PASCAL, assembly language, markup languages (e.g., HTML, SGML, XML, VoXML), and the like, as well as object-oriented environments such as the Common Object Request Broker Architecture (CORBA), Java™ and the like. Such programs may also include design or simulation environments such as Matlab®. In general, however, all of the aforementioned terms as used herein are meant to encompass any series of logical steps performed in a sequence to accomplish a given purpose.

As used herein, the term "network" refers generally to any type of telecommunications or data network including, without limitation, hybrid fiber coax (HFC) networks, satellite networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.).

Overview

In one salient aspect, the present invention provides improved apparatus and methods for object (e.g., target) tracking based on imagery corrupted or otherwise degraded by noise, such as that due to the sensor(s) used to obtain the image, medium-induced noise such as scintillation, and target reflection noise such as speckle. Advantageously, the present invention estimates or resolves the target position with greater accuracy and robustness than current solutions, based in part on its ability to compensate for or remove such noise.

In the exemplary embodiment, the invention utilizes a statistics-based method for the tracking of targets in such "noisy" image environments. The target position within the image is estimated from sequences of images where a random, temporally and/or spatially fluctuating medium is continuously distributed between the target and the observer or the sensor(s), and the target has at least some reflectivity as well as identifiable edges or transitions in the absence of the medium. Acquired images (e.g., those form an imaging sensor) are normalized and sampled, and then segmented into two or more (e.g., target and background) pixel sets. Intensity statistics of the pixel sets are determined, and a prior probability image from a previous time step smoothed. The smoothed prior image is then shifted to produce an updated prior image, and a posterior probability image calculated using the updated prior probability via the application of Baye's Rule. Finally, the position of the target (e.g., in the form of positional errors or "tilts") is extracted using the posterior probability image.

The present invention is well-suited to, inter alia, situations in which (i) data is collected in noisy (very low signal-to-noise) environments, (ii) targets to be tracked are non-cooperative, and (iii) a single sensor is available for processing. Multiple sensors, cooperative beacons or reflectors on targets, predetermined target shape and size templates, and additional illumination for generating additional signal are rendered unnecessary. Targets are extracted from data purely from statistical information constructed from single sensor image sequences.

The invention can advantageously be implemented in literally any computer language or development environment (such as e.g., C, C++ or Matlab), to be inserted into software simulation programs, firmware, and/or hardware systems. It can be readily coded into hardware devices such as FPGAs, ASICs, microprocessors (CISC or RISC), DSPs, Reconfigurable Computing Fabrics (RCFs), or computers with real-time operating systems (RTOS), as required by the particular application. For example, one embodiment of the invention comprises a computer program written using Matlab® and includes modules or routines adapted to: (i) scale an input image at a given time; (ii) calculate image statistics; (iii) calculate a smoothing parameter; (iv) calculate a posterior probability, (v) smooth and shift the posterior; and (vi) determine one or more tilts.

A System-on-Chip (Soc) integrated circuit that embodies the various image processing methodologies is also disclosed.

Description of Exemplary Embodiments

Various aspects and embodiments of the present invention are now described in detail.

It will be recognized by those of ordinary skill that the embodiments described herein are merely exemplary of the broader concept of providing enhanced image processing for, inter alia, target tracking. Many different variations of the apparatus and methodology (some of which are described herein) may be employed consistent with the invention. For example, while the exemplary embodiments described herein are used for tracking of missiles (particularly boot-phase missiles) or other projectiles, the present invention may be used for processing images in any number of different applications including, without limitation, astronomical and space imaging, free space laser communication systems, automated lasik eye surgery, and tactical weapon systems (e.g., laser based), any of which can benefit from enhanced image clarity and/or object location accuracy.

Tracking System and Apparatus

Figure 1A:
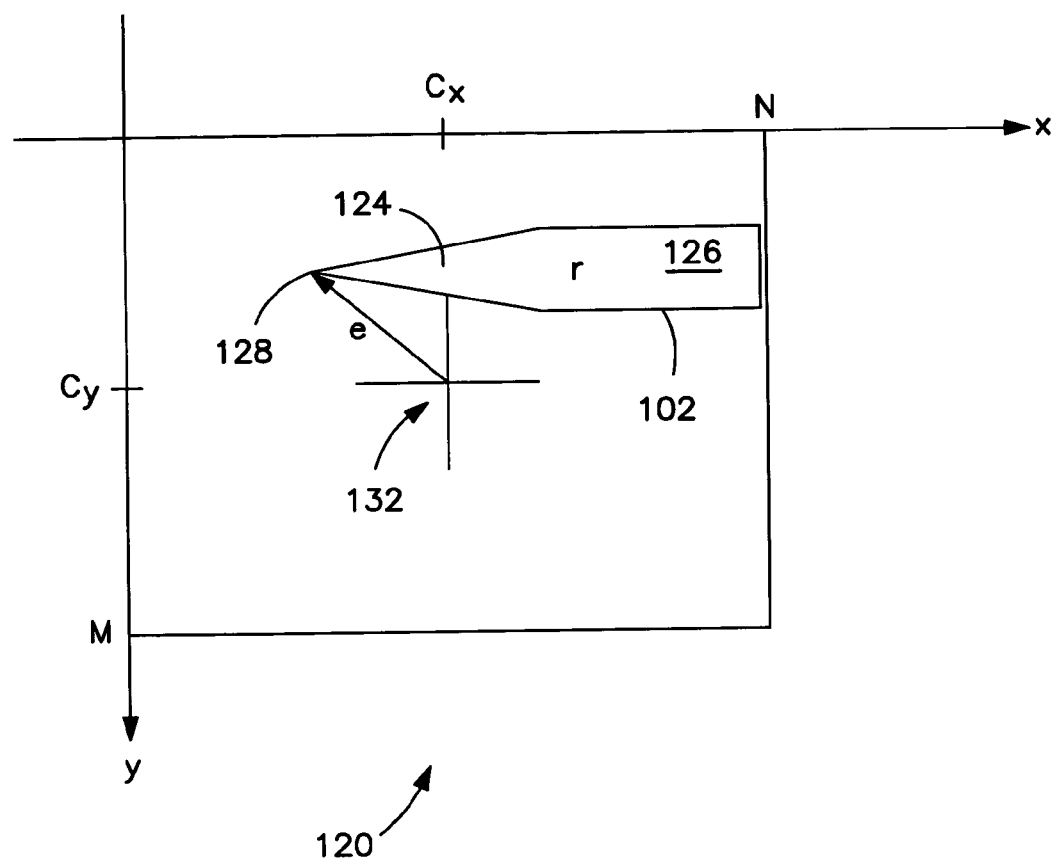
FIG. 1a is a graphical representation of one embodiment of a track gate used with the system of FIG. 1.

Referring now to FIGS. 1 and 1a, one exemplary embodiment of the tracking apparatus according to the present invention is described in detail. It will be appreciated that while described in the context of a missile illumination and tracking system, the principles of the present invention are more broadly applicable to other types of applications and systems, whether active or passive, or based on electromagnetic radiation or otherwise.

FIG. 1 is a functional block diagram illustrating a first embodiment of the object tracking system according to the invention. As shown, the system 100 comprises a tracked object (e.g., missile, aircraft, or projectile in flight) 102, target illuminator 104, a sensor/array 106, an actuator 108, and a controller 110. As will be recognized by those of ordinary skill, the illustrated system 100 comprises an "active" system wherein the illuminator 104 emits illuminating energy 112 to "paint" the target 102. Reflected or remitted energy 114 from the target 102 is gathered by the sensor/array 106, and processed by the controller 110 as described in greater detail subsequently herein. The controller 110 generates control signals and other useful data to, inter alia, control the actuator 108 to steer the sensor/array 106 so as to maintain tracking or lock on the target over time as the latter moves in three-dimensional space. The illuminator may comprise for example a laser (i.e., coherent light) target designator of the type well known in the munitions arts, although other types of illuminating sources and imaging modalities (including radio frequency, microwave, millimeter wave systems, or even high-frequency acoustic systems in underwater applications) may be used.

Similarly, a passive system (104 not shown) may be employed, wherein no active illuminator is used; rather, the reflected or remitted energy is derived from another source such as ambient light (e.g., solar radiation, lunar reflection of solar radiation, etc.) and/or infrared-band electromagnetic radiation emitted by the target during flight (e.g., from heat generated by air friction, propulsion sources, and so forth). The present invention is suited to these low signal-to-noise situations, as well as those requiring an active system for target illumination or interrogation.

The sensor/array 106 of the system 100 may comprise one or more individual sensors, or an array of homogeneous or heterogeneous sensors as desired. For example, one variant of the sensor/array 106 comprises a single electro-optical sensing device, such as a CMOS or CCD-based semiconductor device of the type well known in the semiconductor arts or digital imaging devices. One or more infrared (IR) band sensors may also be used (alone or in conjunction with the optical band sensors). As used herein, the term "optical" refers to electromagnetic radiation having a wavelength in the visible or near-visible regions. For stealth and a variety of other reasons, however, it may be desirable to utilize an illuminator (and hence sensor/array 106) that operates at a primary wavelength other than that visible to the human eye.

Furthermore, a "multi-mode" system may be desired, wherein one or more sensors 106 (and even optionally the illuminator 104) are designed to receive or sense energy across multiple wavelength bands, such as visible, IR, and UV either simultaneously or in a serial fashion, so as to permit tracking through various types of interposed mediums (e.g., different types of atmospheric conditions).

The actuator 108 may comprise literally any type of mechanism or system for moving the position and/or orientation of the sensor/array 106 in order to effectuate accurate tracking of the target. For example, one actuator mechanism useful with the invention comprises a set of electrical motors (with position encoders) adapted to control the elevation and azimuth of the sensor/array 106. Another actuator mechanism comprises a set of fast steering mirrors. Other types of mechanisms (e.g., hydraulic, gimbals, or other mechanical pointing and tracking hardware) may be used with equal success depending on the particular application. It will further be appreciated that all or part of the system 100 may be mounted on a mobile platform such as a land vehicle, ship, satellite, spacecraft or blimp, and hence the actuator 108 (and in fact controller) may be configured to compensate for parent platform 116 motion as well as changes in position over time. For example, in one variant, the platform's position is periodically determined according to an actual or estimated "fix" such as that obtained from a GPS-based or inertial navigation system (e.g., SINS), and changes in position incorporated into the determination of error or control signals by the controller 110. The parent platform 116 may also have a known or predictable position or trajectory as a function of time (such as a satellite in orbit), and hence this position can be estimated according to the well-known algorithms of orbital mechanics.

As is well known, in the tracking arts, mirrors are used as positioning devices to point the illuminators in the desired directions. In particular, systems requiring significant alignment and stabilization (such as e.g., an airborne laser system) may use one or more steering mirrors in the optical train to maintain the beams pointed, aligned, and stabilized.

FIG. 1a illustrates an example image showing the target (e.g., missile) 102 disposed within a track gate 120 of the system 100. The term "track gate" refers generally to a window or other spatial construct used for framing or providing spatial context for the target 102. In the example of FIG. 1a, the track gate comprises a window of size N by M pixels, although it will be appreciated that other configurations of track gates can be used consistent with the invention (including non-Cartesian systems such as those rendered in polar coordinates).

The reference image r is a two-dimensional projection of an object shape (e.g., right-triangular missile nose cone 124 joined with a long cylinder body 126) in which the two-dimensional view in which the length of the body is much longer than the size of the track gate N. The position of the missile nose tip 128 in FIG. 1a has the coordinates of $e=(e_x, e_y)$ that are the distance of the missile nose tip from the center pixel $c=(c_x, c_y)$ 132 of the track gate in the x-(abcissa) and y-(ordinate) directions. The subscript indicates the direction of the two dimensional coordinates that are perpendicular to each other. The exemplary convention of indexing used herein is that the first index is referred to as the y-(ordinate) or "cross-stream" direction, while the second index is referred to as the x-(abcissa) or "stream-wise" direction. Here, the term "stream" is used to refer generally to the direction of object propagation within the gate 120.

In operation, the system 100 utilizes error signals (such as for example the aforementioned value of the missile nose e) generated by the controller 110 to control the position of the actuator 108 (and optionally the illuminator 104, although the illuminator and sensor/array 106 may be physically coordinated or combined so as to obviate the need for separate control signals).

The distance e (also referred to as the error signal) 110 of FIG. 1a is the target position within the image, which is the quantity to be tracked. It will be recognized that in the present context, tilt may be a combination of true physical target motion (i.e., the target moving through space) and medium-induced or "apparent" target motion (i.e., that due to the propagation of the reflected or remitted energy moving through the interposed medium before reaching the sensor/array 106). If reflected or remitted energy 114 from the target 102 is reflected by actuators then gathered by the sensor/array 106 directly, the distance e is an error signal composed of the tilts θ and the actuator position α, resolved into their Cartesian components; i.e., $e=\theta+\alpha=(\theta_x+\alpha_x, \theta_y+\alpha_y)$.

The notation I(r-e) is used herein to describe the image of a displaced component of the object being tracked (e.g., nose cone of a missile) and its body r by a distance e.

In the illustrated embodiment, the image data is collected from the sensor 106 (e.g., optical, IR or other wavelength device) pointed generally at the missile nose 108. The sequence of images, denoted by $I^t(r-e^t)$, is modeled as arising from a binary image corrupted by intensity fluctuations. To estimate the position of the target in the image at any given time, the present embodiment of the invention detects the missile nose tip position as the tilt, although it will be appreciated that other approaches and object features may be used. Thus in the illustrated example, the missile is tracked by a method that detects the location of the tip from a sequence of temporally filtered images.

Object Tracking Methodology

Figure 1B:
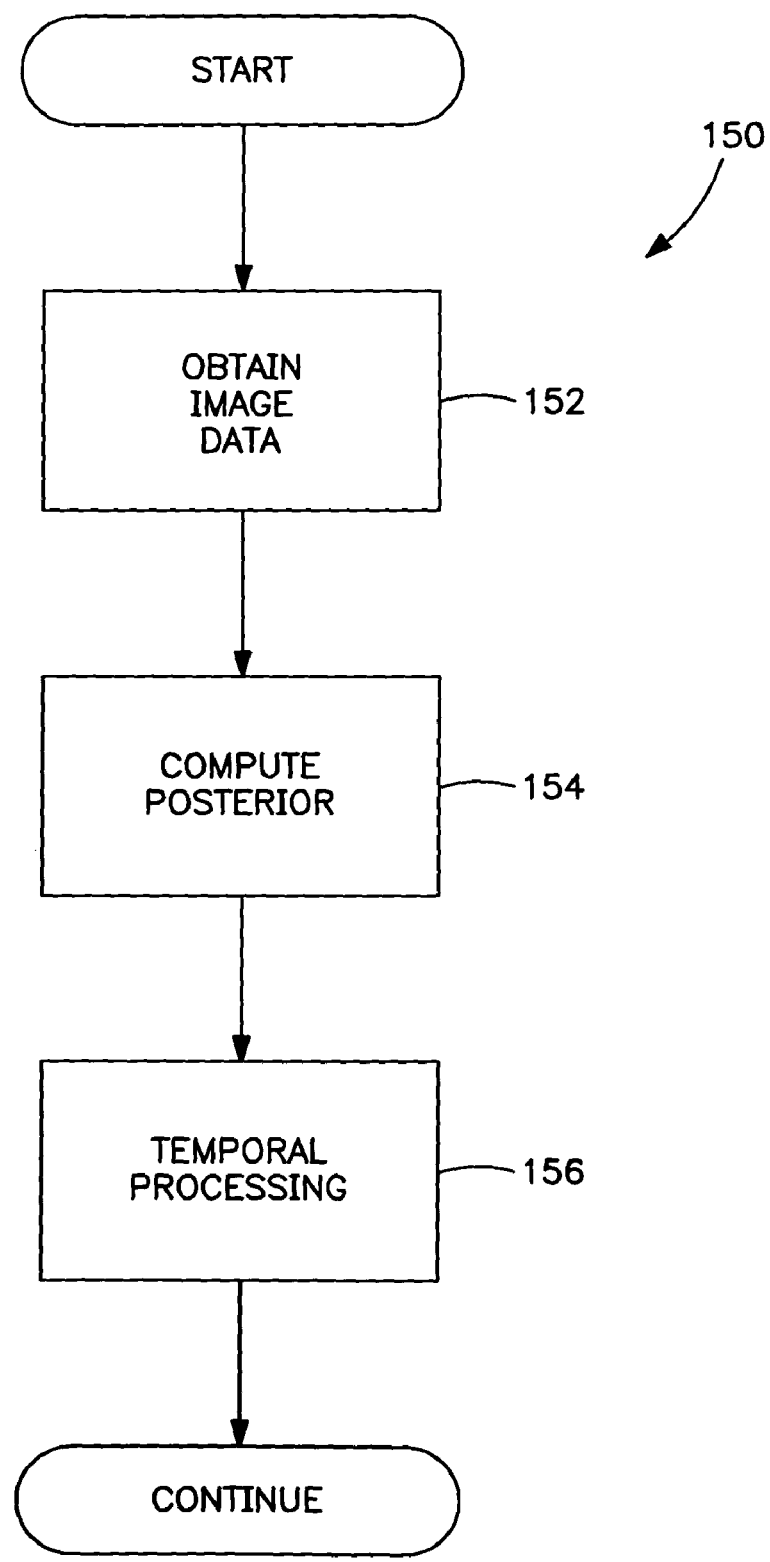
FIG. 1b is a logical flow diagram of one embodiment of the generalized methodology of tracking according to the invention.

Referring now to FIG. 1b, an exemplary embodiment of the generalized method of object tracking according to the present invention is described in detail. It will be appreciated that while described in the exemplary context of a missile illumination and tracking system such as that of FIG. 1, the methodology of FIG. 1b is more broadly applicable to tracking literally any kind of object of any scale, whether by active illumination or other means (e.g., passive).

As shown in FIG. 1b, the first step 152 in the exemplary method 150 comprises generating a plurality of image frames. This may be accomplished using any number of techniques, including (i) obtaining the image data by actively illuminating the target 102 with an illumination source (such as, e.g., a source of electromagnetic radiation including coherent (laser) light or infrared radiation), or (ii) obtaining the image data via a passive sensor (such as an optical or IR sensor).

The second step 154 in the method 150 comprises computation of one or more posterior probabilities. Exemplary processing conducted during this step 154 is described in detail below with respect to FIGS. 2-3a. In one approach, a Bayesian segmentation is utilized in which the images obtained as part of step 152 are segmented into multiple (e.g., 2) classes by employing a logical construct or rule system (here, Bayes' theorem) to the probability density functions and prior probability. A posterior probability representing the likelihood that a pixel is within one class or another, given the observation, is then derived.

Lastly, the third step 156 in the method 150 comprises temporal processing from one frame to the next (i.e., using data from one frame to affect the decision-making process of one or more subsequent frames). Specifically, the aforementioned posterior probabilities for the current image frame of data are blurred (smoothed) and mapped into the "prior" probabilities for the next image. The propagation of posterior (for current) to prior (for future) is the means of capturing the dynamic processes of the moving target, as well as those associated with the medium through which the images are being captured. Such medium may comprise, for example, air (or other types of atmosphere), the vacuum of space, or even other media such as water or other liquids. The forward propagation of the posterior data provides an effective mechanism for isolating these dynamic processes and removing them from the underlying image, in effect filtering image noise.

Image Processing Methodology

Figure 2:
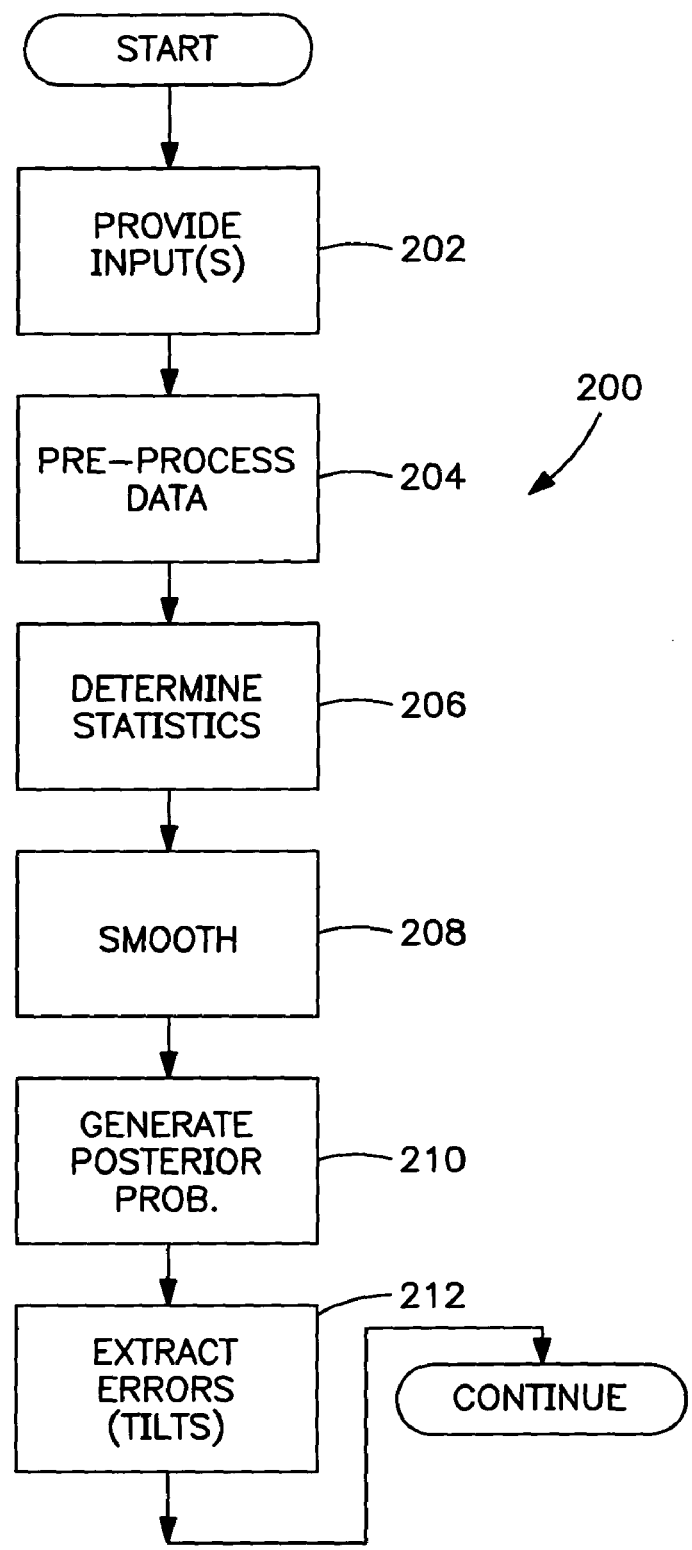
FIG. 2 is a logical flow diagram of one embodiment of the generalized methodology of image processing according to the invention.
Figure 2A:
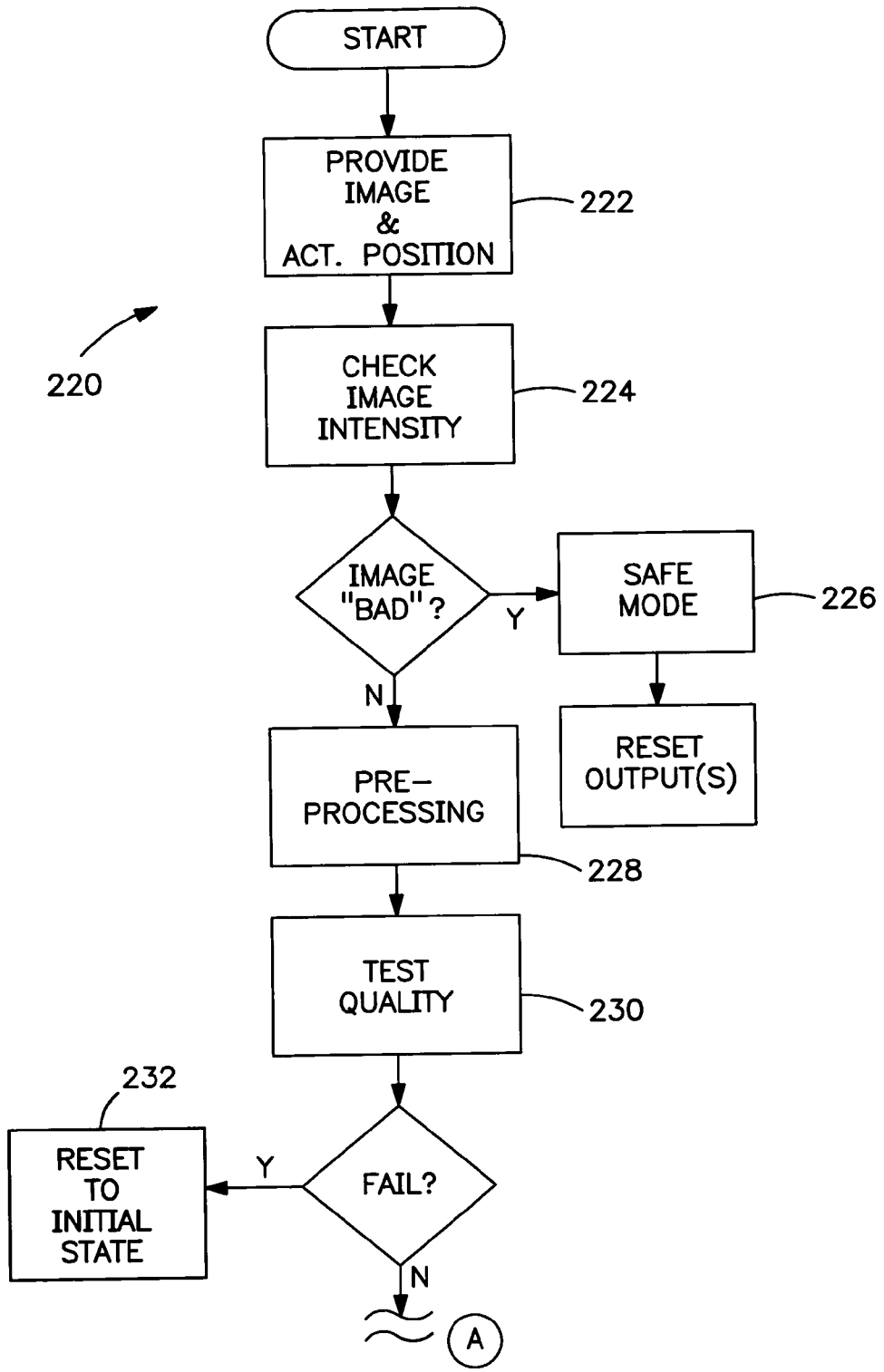
FIG. 2a is a logical flow diagram of one exemplary embodiment of the method of FIG. 2.
Figure 2A:
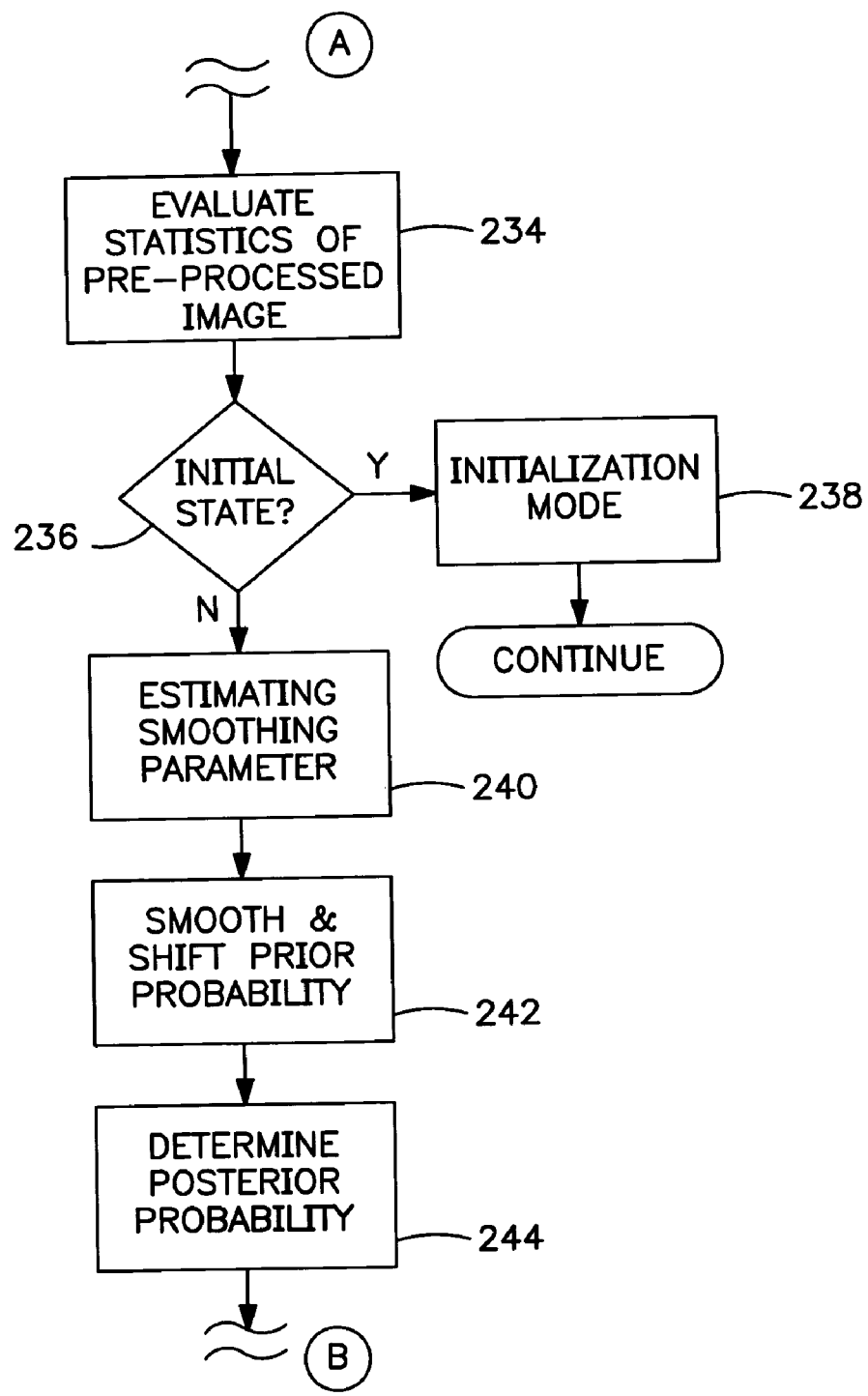
Figure 2A:
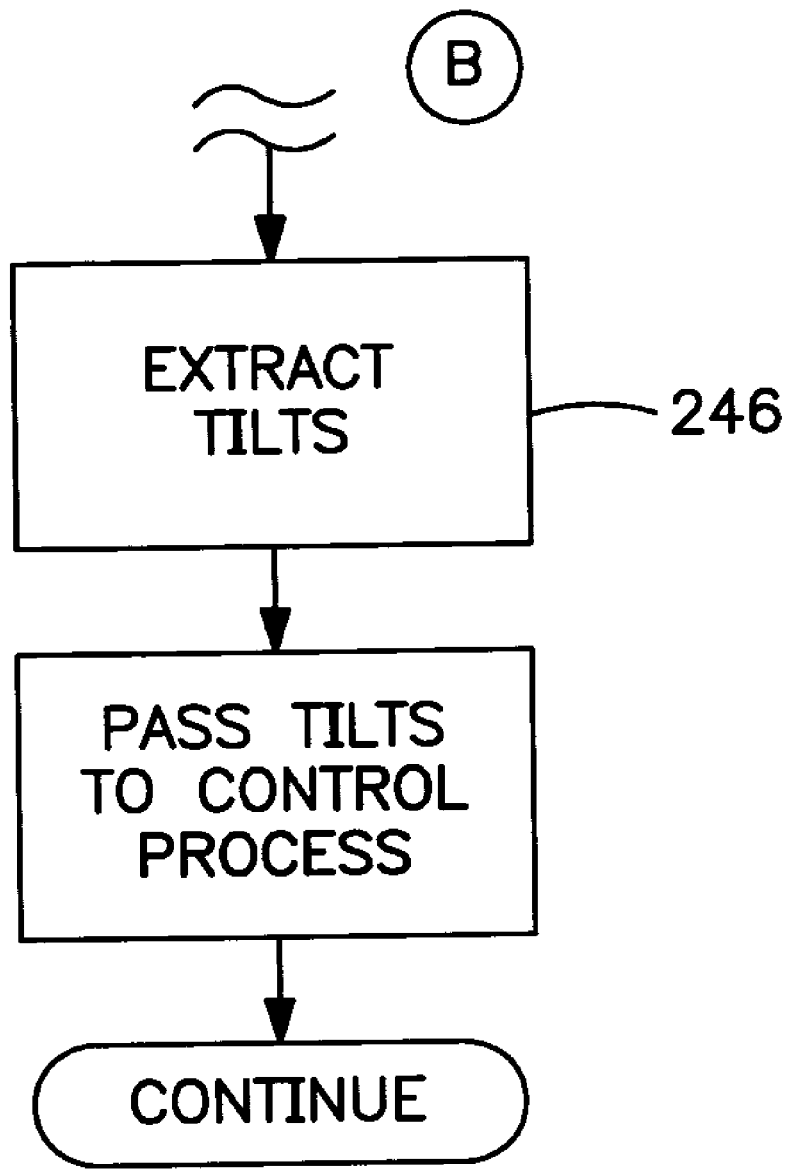

Referring now to FIGS. 2 and 2a, the generalized methodology of image data processing according to the invention is described. It will be appreciated that while described in the context of a missile illumination and tracking system, the methodologies of FIGS. 2 and 2a are more broadly applicable to tracking literally any kind of object of any scale, whether by active illumination or other means (e.g., passive). Furthermore, it will be recognized that the methodology of FIG. 2a is but one specific implementation of the broader method of FIG. 2.

In the first step 202 of the method 200, one or more inputs are provided. Such inputs may comprise, for example, data relating to one or more prior images obtained by the sensor(s) 106, as well as actuator position or system control gain and prior state information.

Next, per step 204, current image data obtained from the sensor(s) or another source is pre-processed, including for example, checking the intensity level pixels comprising the image data. Additional data processing may also be conducted during this step 204, including without limitation normalization of the intensity, filtering, shifting and/or processing to enhance resolution or other attributes of the data.

After pre-processing is completed (or contemporaneous therewith), statistics for the pre-processed image data are determined per step 206. As described in greater detail below with respect to the exemplary method 220 of FIG. 2a, these statistics are used at the basis for identification of target (versus) background pixels within the image data.

Smoothing is then applied to the data per step 208, and a posterior probability is generated (step 210). The errors e are then extracted per step 212 in order to, e.g., estimate the difference between the track gate center $c=(c_x, c_y)$ 132 and the target artifact of interest (e.g., missile nose 128), thereby providing target position.

Referring now to FIG. 2a, one specific embodiment of the generalized methodology 200 of FIG. 2 is described in detail.

In the first step 222 of the method 220 of FIG. 2a, two inputs (here, a two-dimensional image and an actuator position or system control gain) are provided at a given time t. In the present context, the 2-D image is denoted by $I^t$, and the actuator position is denoted by $\alpha^t=(\alpha_x, \alpha_y)$. The previous State is also an input, which in this embodiment contains information relating to an estimated smoothing parameter and an updated prior image (discussed in greater detail below).

The image is then checked for its peak intensity per step 224. In the present embodiment, this intensity check is accomplished by determining the number of photon counts per unit time (e.g., per time step), although other approaches may be used. If the peak intensity is less than or equal to a predetermined or deterministic value (e.g., a "noise" threshold or the like), it is declared to be a "bad" frame. The safe mode is then entered per step 226, which increments a bad image counter by 1 and sets the output $e^t$ equal to previous control command with opposite sign so that the actuator returns to its equilibrium position. In the illustrated variant, the threshold is set at a value comprising five times (5×) the standard deviation (σ) of the sensor noise. An example standard deviation is 5 photon counts, although clearly other values (and other bases for establishing the threshold) may be employed consistent with the invention.

If the peak intensity determined in step 224 is larger than the noise or other designated threshold, the image data is passed to a pre-processing step 228. In the present embodiment, this pre-processing step 228 comprises three stages:

1. The image is normalized to a given maximum and minimum intensity (e.g., between a minimum of zero (0) units and a maximum of one (1) unit). This scaling is significant in maintaining the stability of the tracking algorithm. The normalized image is denoted by $I_n^t$.

2. The normalized intensity image is super-sampled to increase resolution. The super-sample rate, $(n_s, m_s)$ for each dimension respectively, takes into account the computation speed and performance requirements; i.e., the higher the sampling rate, the more accurate the tracking and also the larger the required the system bandwidth, but longer computation time. An exemplary super-sample rate values are $n_s=2$ and $m_s=2$. The normalized and super sampled image is denoted by $\hat{I}^t$.

3. The normalized and super sampled image is filtered to reduce the aliasing effects. An exemplary filter is a Gaussian filter. The filtered image is normalized again and resulting $\tilde{I}_n^t$.

It will be appreciated that the normalization scale and/or the super sample rate and/or filter bandwidth may optionally be dynamically varied according to a deterministic or other scheme if desired, For example, in the case where the system controller 110 has sufficient available processing bandwidth to accommodate higher sampling rates (and hence more accurate tracking), these higher rates may be employed until such time as the available bandwidth is consumed, at which point the rate remains static or is lowered. As another alternative, the need for highly accurate tracking can be mandated by the system or its operator(s), at which point bandwidth needed to support the higher super sampling rate is allocated to the tracking process from other less critical functions. Myriad other schemes for dynamic or deterministic variation of these parameters based on, e.g., operation conditions will be recognized by those of ordinary skill when provided the present disclosure.

Next, a check on the data quality (e.g., number of consecutive bad images) is optionally performed (step 230) to decide whether the estimation process continues from a previous state, or starts from the current image (also refer to as the "initial state"). If the number of consecutive bad images is large, we consider that the system has lost the track and the state is reset to initial state per step 232. An example of a large number in the present context is five (5), although this number can be selected based on the desired application and properties of the system, and may even be variable based on, e.g., operational parameters or constraints.

In another approach, images are classified into more than two classes (i.e., "bad" and "not bad"), such as where a third fuzzy class ("good", which is higher quality than "not bad") is used. Myriad other such approaches to "bad" image data evaluation and assessment will be readily implemented by those of ordinary skill.

Figure 2B:
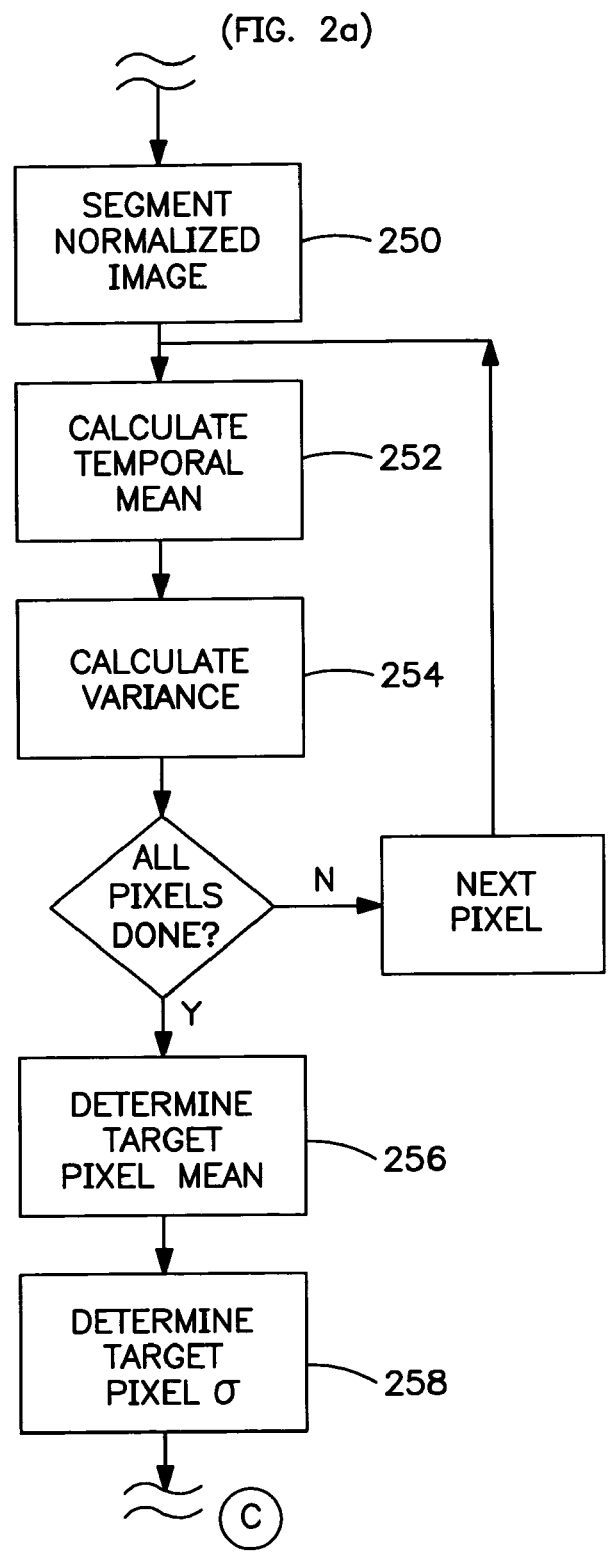
FIG. 2b is a logical flow diagram of one exemplary embodiment of the method of estimating image statistics according to the invention.
Figure 2B:
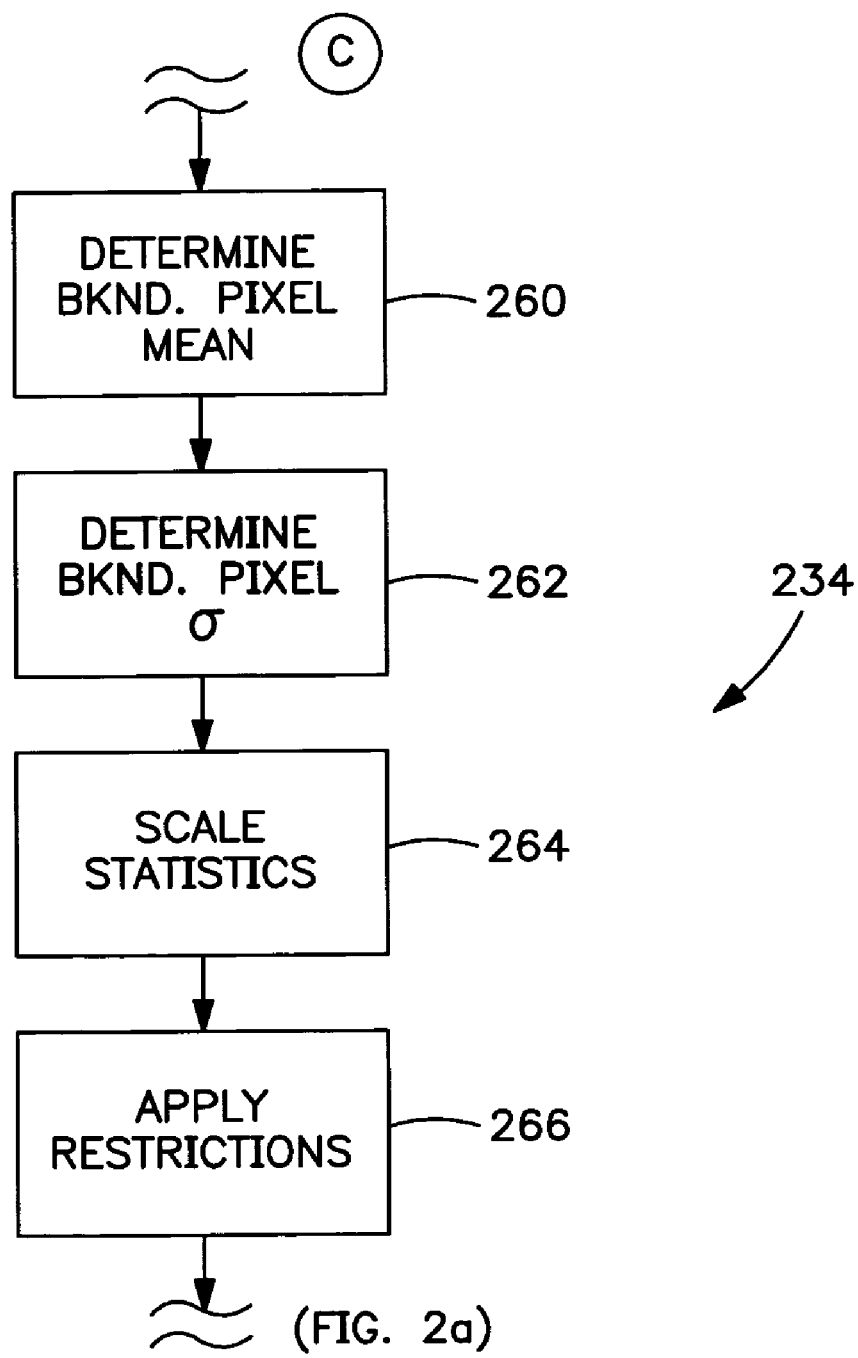

Per step 234, the normalized image $I_n^t$ is next evaluated to estimate its image statistics. In the exemplary embodiment, these statistics are estimated by the following five stages of step 234 (see FIG. 2*b*):

1. The normalized image from step 228 is first segmented per step 250. The image is modeled as having two segments;
i.e., (i) target (i.e., the missile nose or other salient feature of interest), and (ii) background, although it will be appreciated that other classification schemes (and number of classes) may be used. For example, in one alternate embodiment, a three-class system may be employed, including (i) target, (ii) background, and (iii) fringe. The latter class (iii) may represent the edge of a target whose reflectivity is reduced near the egde (a situation common in three dimensional cylindrical shapes) and may be selectively subjected to additional processing to resolve the ambiguity of the edge location.

In the illustrated embodiment, a running or moving average image is calculated from the normalized images according to Eqn (1):

$$\bar{I}_n^t(i,j) = \frac{1}{t}\sum_{k=1}^{t} I_n^k(i,j), \text{ in which } i=1,\ldots,M, j=1,\ldots,N; \quad \text{Eqn. (1)}$$

Figure 3:
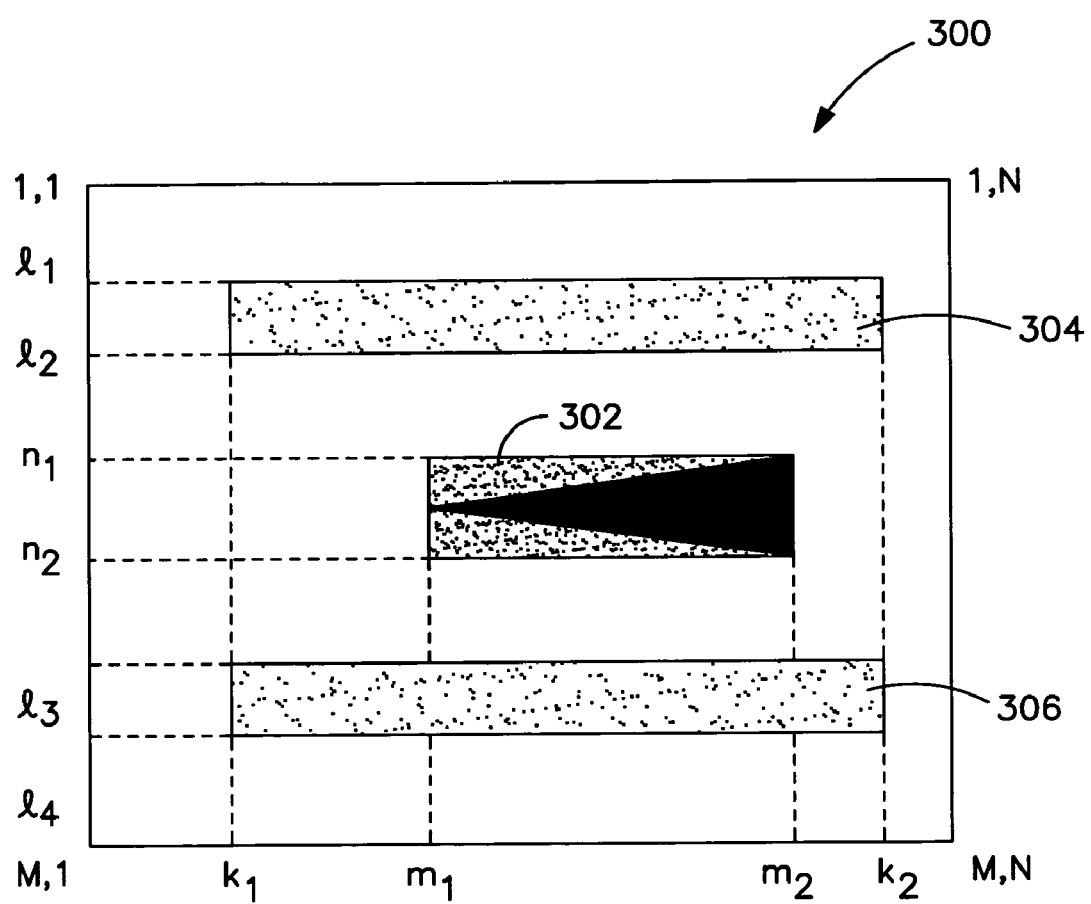
FIG. 3 is a graphical representation of an image track gate, wherein the image has been segmented into various regions according to one embodiment of the invention.

This average may be used for, inter alia, classifying segments. The target segment $S_T$ contains pixels with intensity values larger than a given value measured relative to a peak value in $\bar{I}_n^t$ (e.g., a percentage, such as 40% of the peak value). The target segment $S_T$ is non-fragmented, since the running or moving average comprises a smoothed image. The segment 302 enclosed in the boundary of $(n_1, n_2, m_1, m_2)$ shown in FIG. 3 is an example of this process.

In the present embodiment, the background segment $S_B$ is optimally chosen such that it contains only the sensor noise. It should not include any refraction or diffraction halo of the target caused by medium effects. Also, it should be selected so as not to be too far away (within the track gate) from the target, such that the intensities associated therewith are near zero (0) in value. An example of such background selection is shown in FIG. 3, wherein the selected segments 304, 306 are enclosed in $(l_1, l_2, k_1, k_2)$ and in $(l_3, l_4, k_1, k_2)$, in which:

$l_2 = \max(n_1-(n_2-n_1),2),$ $l_1 = \max(l_2-n_b,2),$ $l_3 = \min(n_2+(n_2-n_1),N-1),$ Eqn. (2)

$l_4 = \min(l_3+n_b,N-1),$ $k_1 = \max(m_1-n_b,2),$ $k_2 = \min(m_2+n_b,M-1).$

The window of the track gate, enclosed in (1,1,M,N) 300 in FIG. 3, is optimally chosen such that $(l_2-l_1)>1$ and $(l_4-l_3)>1$. In the present embodiment, the background strip width $n_b$ is determined by the size of the track gate and the size of the missile image relative to the gate. For example, a track gate of 32×32=1024 pixel² and a target width of 16 pixels, $n_b$ is set at 6. In the exemplary embodiment, the size of the initial background strip is set according to anecdotal information and/or the type of application in which the system is being employed. However, it will be recognized that other methods for selecting $n_b$ may be employed consistent with the invention, including "trial and error", algorithmic analysis and selection (e.g., according to feedback from one or more performance metrics), and so forth.

The total number of pixels in the target and background segments is denoted by $M_T$ and $M_B$, respectively.

2. Next, per steps 252 and 254 of FIG. 2*b*, the temporal mean $\bar{m}_t(i,j)$ and variance $\bar{s}_t^2(i,j)$ of each pixel are calculated from the normalized image $I_n^t$, at time step t using Eqns. (3), (4) and (5):

$$\overline{m}_t(i, j) = \frac{t-1}{t}\overline{m}_{t-1}(i, j) + \frac{1}{t}I_n^t(i, j) \quad \text{Eqns. (3), (4), (5)}$$

$$s_t(i, j) = \frac{t-1}{t}s_{t-1}(i, j) + \frac{1}{t}(I_n^t(i, j))^2$$

$$\overline{s}_t^2(i, j) = \left(1 + \frac{1}{t+1}\right)(s_t(i, j) - \overline{m}_t^2(i, j))$$

in which $i = 1, \ldots, M$, $j = 1, \ldots, N$.

3. Per steps 256, 258, 260, and 262, the target mean and standard deviation ($\hat{\mu}_T$, $\hat{\sigma}_T$) from target segment $S_T$, and the background mean and standard deviation ($\hat{\mu}_B$, $\hat{\sigma}_B$) from background segment $S_B$, are determined at time step t according to Eqns. (6) and (7):

$$\hat{\mu}_K(t) = \frac{1}{M_K}\sum_{j=1}^{M_K} \overline{m}_t^K(j), \quad K = T, B; \quad \text{Eqns. (6), (7)}$$

$$\hat{\sigma}_K(t) = \sqrt{\frac{1}{M_K - 1/t}\sum_{j=1}^{M_K}(\overline{s}_t^K(j))^2 - \left(1 + \frac{1}{t \cdot M_K - 1}\right)\hat{\mu}_K^2(t)},$$

where $\overline{m}_t^K$ and $\overline{s}_t^K$ comprise the collection of the temporal mean and standard deviation of the pixels in the target segment $S_T$ if K=T, and in $S_B$ if K=B, the total number of pixels in the target segment is $M_T$, and the total number in the background segment is $M_B$.

4. The next step 264 is to scale the statistics $\hat{\mu}_K$ and $\hat{\sigma}_K$ according to the factor of Eqn. (8):

$$\frac{1}{\max(\overline{I}_n^t)} \quad \text{Eqn. (8)}$$

in which $\overline{I}_n^t$ comprises the running or moving average image.

5. The final step 266 of the image statistic estimation process 234 is to apply restrictions to $\hat{\mu}_K$ and $\hat{\sigma}_K$ per Eqn. (5):

$$\tilde{\mu}_T = \hat{\mu}_T$$

$$\tilde{\mu}_B = \max(\hat{\mu}_B, 0.01\tilde{\mu}_T) \quad \text{Eqn. (5)}$$

$$\tilde{\sigma}_T = \min(\tilde{\mu}_T, \hat{\mu}_T)$$

$$\tilde{\sigma}_B = \max(2\tilde{\mu}_B, \hat{\sigma}_B)$$

The statistics are calculated at each time step t. However, in the illustrated embodiment, the updating of the statistics when calculating probability density functions is performed less frequently, since such updating can decrease the stability of tracking. For example, the statistics are updated every $n_B$ time steps according to Eqn. (9):

$$\mu_K(t) = \quad \text{Eqn. (9)}$$

$$\begin{cases} \tilde{\mu}_K((\gamma-1)n_B), & \text{if } (\gamma-1)n_B \geq t > (\gamma)n_B \\ \tilde{\mu}_K((\gamma)n_B), & \text{if } t = (\gamma)n_B \end{cases}, \gamma = 1, 2, \ldots$$

-continued $$\sigma_K(t) = \begin{cases} \tilde{\sigma}_K((\gamma-1)n_B), & \text{if } (\gamma-1)n_B \geq t > (\gamma)n_B \\ \tilde{\sigma}_K((\gamma)n_B), & \text{if } t = (\gamma)n_B \end{cases}, \gamma = 1, 2, \ldots$$

The value of $n_B$ can be determined using one or more relevant parameters of the underlying system, one of which is the system sample rate. An exemplary value is 20, although it will be appreciated that other values (whether fixed, variable or deterministic) can be substituted.

Referring again to FIG. 2a, if the system state is at the initial state (as determined in step 236), the initialization mode is entered (step 238). This mode initializes the prior probability by integrating the normalized, super sampled and filtered image from step 228 for first $n_1$ time steps:

$$\pi^t = k_1 \tilde{I}_n^t + \pi^{t-1} \quad \text{Eqn. (10)}$$

where t=1, ..., $n_1$ and $\pi^0$=0.5 in the illustrated embodiment. The integral gain $k_1$ is set equal to 0.1, although other values may be used. The output e's (errors) are each set to zero (0) for the consecutive $n_1$ time steps.

After the initial $n_1$ time steps, the updated actuator position is next received and analyzed to estimate the smoothing parameter τ (step 240). In the illustrated embodiment, the smoothing parameter τ is the standard deviation of the change in tilts $\Delta(t-1)=\theta^{t-1}-\theta^{t-2}$, although it will be recognized by those of ordinary skill that other metrics, whether related to tilt change or otherwise, may be used as the basis for smoothing. If no information concerning tilt differences is available, the present embodiment estimates the tilt difference. This can be accomplished, e.g., by using the estimated error signal combined with the measured mirror (actuator) positions. Applying the definition of standard deviation, $\tau_t$ at time step t is given by Eqn. (11):

$$\tau_t = \frac{1}{2}\sqrt{\frac{1}{t-2}\sum_{i=1}^{t-1}(\Delta(i) - \overline{\Delta})^2} \quad \text{Eqn. (11)}$$

where $$\overline{\Delta} = \frac{1}{t-1}\sum_{i=1}^{t-1}\Delta(i).$$

The tilt is approximated by $\theta^{t-1}=e^{t-1}-\alpha^{t-1}$, where $e^{t-1}$ is the error signal extracted at time t−1 and $\alpha^{t-1}$ is the measured mirror position at time t−1. The smoothing parameter $\tau_t$ is preferably calculated at each time step. However, the smoothing parameter τ is updated every $n_\tau$ steps to ensure track stability, according to Eqn. (12) below:

$$\tau = \begin{cases} \tau_t((\gamma-1)n_\tau), & \text{if } (\gamma-1)n_\tau \geq t > (\gamma)n_\tau \\ \tau_t((\gamma)n_\tau), & \text{if } t = (\gamma)n_\tau \end{cases}, \gamma = 1, 2, \ldots \quad \text{Eqn. (12)}$$

In the present embodiment, the value of $n_\tau$ is determined by the attributes of the underlying system. An example value is 50, although other values may be used. During the first $n_\tau$ steps, the smoothing parameter τ is set at an initial value.

Optimally, the most effective initial value is one derived from the true tilts if a priori knowledge regarding such tilts is available; otherwise, a predetermined value, for example 0.5, is acceptable in most situations.

The smoothing parameter τ, together with the relevant actuator positions are then used in step 242 to smooth and shift the prior probability $\pi^t$. Even more accurate tracking can be obtained if one can predict the tilts error. Prediction is achieved by shifting the input image $I^t$. Equivalently, the prior probability can be shifted. In the illustrated embodiment, the shifting is performed with a Gaussian smoothing kernel G with standard deviation τ and mean Δα, according to Eqn. (13), to produce an updated prior probability $\pi^{t+}$:

$$\pi^{t+} = G(\tau, \Delta\alpha) * \pi^t \qquad \text{Eqn. (13)}$$

although other approaches may be substituted. For example, smoothing via total variation, Eikonal equation propagation, nonlinear heat equation smoothing, or other convolution kernels can be employed for this purpose. The prior probability $\pi^t$ is calculated at previous time step and is stored in memory 406 (see FIG. 4). The smoothing in this embodiment is carried out through use of a Fast Fourier Transform (FFT), according to Eqn. (14) below:

$$\hat{g} = FFT(G(\tau, \Delta\alpha)) = \qquad \text{Eqn. (14)}$$

$$\exp(-k_x^2\tau^2/2 - k_y^2\tau^2/2) \cdot \exp(-ik_x(\Delta\alpha)_x - ik_y(\Delta\alpha)_y) \text{ for } k_x =$$

$$1, \ldots 2n_sM; k_y = 1, \ldots 2n_sN;$$

$$\pi^a = \text{augmented}(\pi^t)$$

$$\hat{\pi} = FFT(\pi^a)$$

$$\pi_g = FFT^{-1}(\hat{g} \cdot \hat{\pi})$$

$$\pi = \{\pi_g\}_{i=n_sN/2+1, j=n_sM/2+1}^{(3/2)n_sN, (3/2)n_sM}$$

$$\pi_{ij}^{t+} = \begin{cases} \pi_{ij} & \text{if } \pi_{ij} \le 1, \text{ for } i = 1, \ldots, n_sN; j = 1, \ldots, n_sM \\ 1 & \text{if } \pi_{ij} > 1. \end{cases}$$

The exemplary augmented matrix $\pi^a$ is double the size of $\pi^t$ in both dimensions. The center ($n_sN$, $n_sM$) of $\pi^a$ is the same as that for the prior probability $\pi^t$. The remainder of the pixels of $\pi^a$ are filled with zeros, with the exception of the last ($n_sN/2$) columns, which are copies of the data of the last column of prior $\pi^t$. The mean parameter Δα is set equal to ($\alpha^t - \alpha^{t-1}$), where $\alpha^t$ comprises the measured mirror (actuator) position at time t.

The now-updated prior probability $\pi^{t+}$ (step 242), the image statistics (step 234), and the pre-processed image (step 228) are next utilized in step 244 to determine a posterior probability $\pi^+_{ij}$. In the illustrated embodiment, Bayes' rule is used to calculate the posterior probability. As is well known, Bayes' rule for computing the probability (P) of a "target" given visual input (V) can be generally stated as follows:

$$P(T|V) = [P(V|T)/P(V)]P(T)$$

Bayes' rule essentially computes the conditional posterior probability of the target given a sensory input P(T|V) by modifying the unconditional prior probability of the target P(T) on the basis of sensory input V. The conditional probability P(V|T) is the likelihood of observing V, given the target. The unconditional probability P(V) is the likelihood of observing the same input V under any circumstances.

Thus, Bayes' rule can be used to compute P(T|V) by multiplying P(T) by the ratio of P(V|T) to P(V). As an example, if the expectation of a target is 10% (in the absence of sensory input), then P(T) would equal 0.1. If an input (e.g., V=20) is observed, and if this input is twice as likely when associated with a target as under general circumstances, then the ratio of P(V|T) to P(V) is equal to 2. On the basis of this sensory input, Bayes' rule states that P(T|V) should equal 0.2. Thus, the prior target probability P(T)=0.1 has been modified by the sensory input to the posterior target probability P(T|V)=0.2. Hence, on the basis of the sensory input received, the chances of a target are increased from 10% to 20%. See, e.g., Berger, J. O. *Statistical Decision Theory and Bayesian Analysis*, Springer-Verlag, New York, 1985, incorporated herein by reference in its entirety, for a discussion of Bayes' rule and related topics.

Posterior probability is calculated according to Bayes' Rule using the exemplary form of Eqn. (15):

$$\pi_{ij}^+ = \frac{f(\tilde{I}^t(i,j)|T)\pi_{ij}^{t+}}{f(I^t(i,j)|T)\pi_{ij}^{t+} + f(I^t(i,j)|B)(1-\pi_{ij}^{t+})} \qquad \text{Eqn. (15)}$$

although other approaches and logical constructs may be used in place of a Bayesian approach. This likelihood or "corrector" determination step 244 effectively computes the posterior probability that pixel ij is a target pixel, given the image observed at time t.

The statistical model used for the image in the present embodiment assumes that the probability density functions $f(z|0)$ and $f(z|1)$ measure the likelihood of the normalized intensity value z as resulting from a background or target pixel respectively, where 0 and 1 represent background and target pixels, respectively. The probability density function is determined by the nature of the image data. In one variant, a normal distribution according to Eqn. (16) is used:

$$f(\tilde{I}^t|K) = \frac{1}{\sqrt{2\pi}\,\sigma_K}\exp\left(-\frac{(\tilde{I}^t - \mu_K)^2}{2\sigma_K^2}\right) \qquad \text{Eqn. (16)}$$

where $K = T, B$.

Per step 246, the posterior probability of step 244 is used to extract the error signal (tilt(s)). Many possible approaches may be used in this regard. In the exemplary embodiment, an iterative approach (e.g., IM×C algorithm) is used. This approach has been demonstrated by the inventors hereof to exhibit excellent performance in many applications; however, it will be recognized that feature extraction schemes may be used consistent with the invention, depending on the particular application and desired attributes. For example, a 19-point or general N-point algorithm of the type well known in the mathematical arts may be applied to the smoothed posterior probability. Gradient approaches may also be applied to the posterior probability image in order to detect the leading edge. The posterior may be used to mask the original intensity image, and the resulting masked intensity may be centroided. Other algorithms include fitting known shapes (triangles, parabolas, or boxes) to the posterior's edge or applying an active contouring algorithm to the posterior's edge may be employed.

Figure 2C:
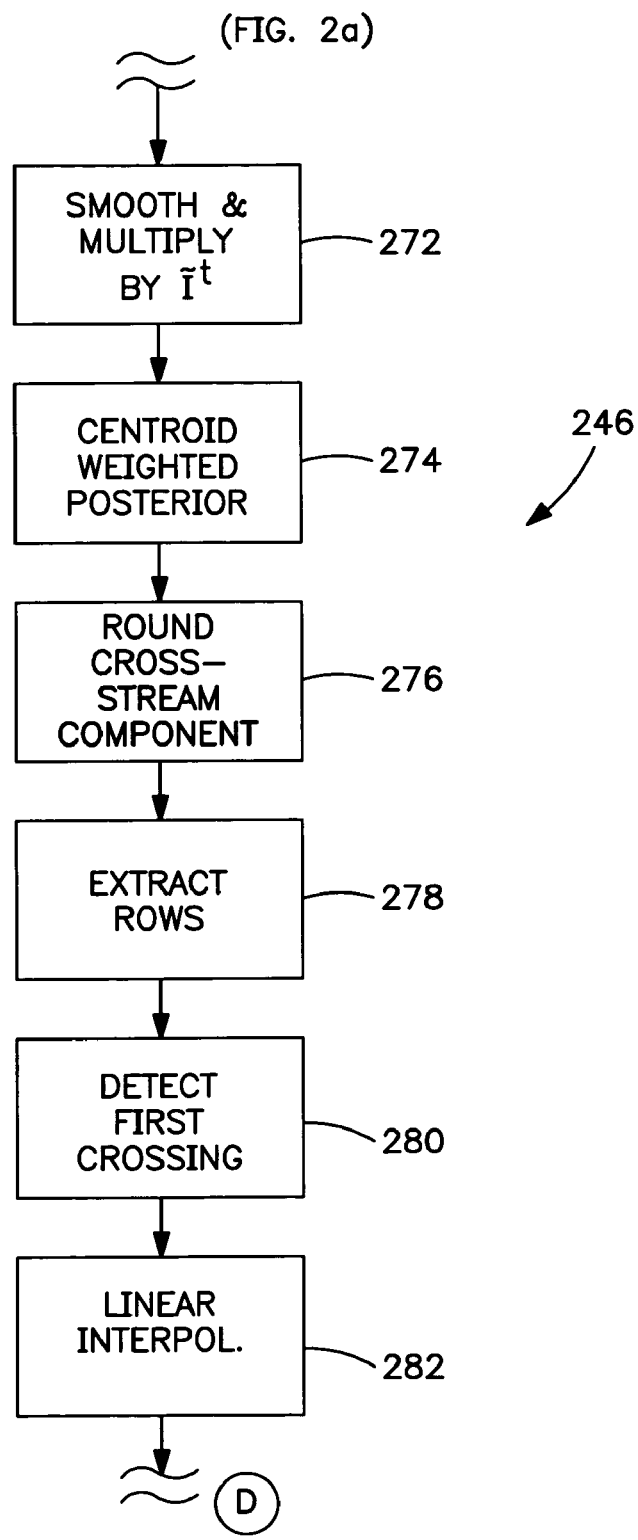
FIG. 2c is a logical flow diagram of one exemplary embodiment of the method of extracting error signals according to the invention.
Figure 2C:
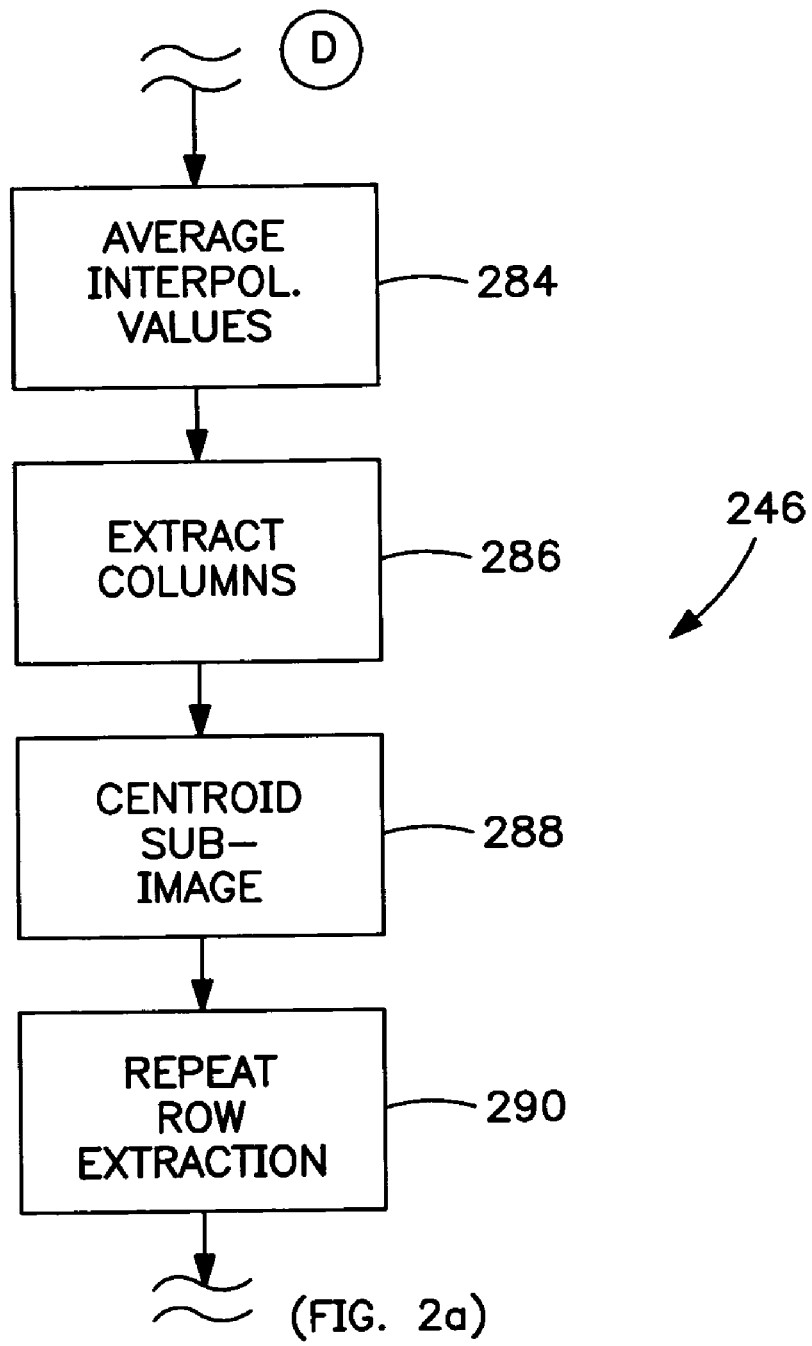

The exemplary error signal extraction process 246 involves the following method (FIG. 2c).

Per step 272, the posterior probability is smoothed and then is multiplied, pixel-by-pixel, with the pre-processed, originally observed intensity $\tilde{I}_n^t$. This intensity-weighted posterior is next centroided (step 274), and the y-(transverse or "cross-stream") component of the centroid rounded per step 276 to the nearest integer value for used in the next step. These processes are shown in Eqns. (17)-(20) below:

$$\pi^{++} = G(\tau, 0) * \pi^+ \qquad \text{Eqns. (17) - (20)}$$

$$I^+ = \tilde{I}^t \cdot \pi^{++}$$

$$y_1 = \frac{\sum_{j=1}^{2M} \sum_{i=1}^{2N} i I_{i,j}^+}{\sum_{j=1}^{2M} \sum_{i=1}^{2N} I_{i,j}^+}$$

$$y = \text{round}(y_1)$$

Next, per step 278, a number of rows (or stream-wise sections) of the smoothed posterior probability are extracted. In the present embodiment, three (3) rows are selected: (i) the y-centroid row, (ii) one row above the y-centroid row, and (iii) one row below. This approach effectively seeks to identify the middle three rows in the smoothed posterior probability image, corresponding to the centerline of the target and its two "neighbors". It will be recognized, however, that other numbers of contiguous rows can feasibly be used consistent with the invention.

In each of these three rows, the first crossing of a threshold value (here, a fixed value of 0.50, although it will be recognized that other fixed values, and in fact non-fixed values, may be used as well) is detected per step 280. Sub-pixel resolution is optionally obtained using a piece-wise linear interpolation or similar approach in each row (step 282). These three numbers (i.e., the first crossings in each row) represent estimated x-positions within the track gate of the leading edge of the target. These values are then averaged (step 284) to obtain a first estimate of the nose position ($x_1$) as shown in Eqn. (21) below:

$$x_1 = \frac{1}{3}\sum_{k=1}^{3} \xi_k, \quad k = y-1, y, y+1 \qquad \text{Eqn. (21)}$$

where $$\xi_k = \begin{cases} j - \frac{\pi_{k,j}^{++} - 0.5}{\pi_{k,j}^{++} - \pi_{k,j-1}^{++}}, & \text{if } j > 1 \\ 1, & \text{if } j = 1 \end{cases}$$

Using this averaged x- or nose position, an extraction of columns (i.e., y- or cross-stream sections) of the intensity-weighted posterior (step 272 above) corresponding to one column in front of, through z-columns behind, the nose position value determined above ($x_1$ rounded to the nearest integer) is performed per step 286. This sub-image is then centroided per step 288 to obtain a more localized (and typically better) estimate of the y-tilt or error. Using this localized y-tilt, step 278 (row extraction) are repeated per step 290 in order to upgrade the x-tilt estimate. This upgraded x-tilt and the localized y-tilt comprise the final tilts or errors extracted for use by the controller 110 in controlling the actuator of the system 100 (see FIG. 1). Specifically, the form of Eqns. (22)-(25) are used:

$$x = \text{round}(x_1) \qquad \text{Eqns. (22) - (25)}$$

$$y_2 = \frac{\sum_{j=x-1}^{x+z} \sum_{i=1}^{2N} i I_{i,j}^+}{\sum_{j=x-1}^{x+z} \sum_{i=1}^{2N} I_{i,j}^+}, \quad z = 3^* n_s + \delta(n_s > 1)$$

$$y = \text{round}(y_2)$$

$$x_2 = \frac{1}{3}\sum_{k=1}^{3} \xi_k, \quad k = y-1, y, y+1$$

where $n_s$ is the super-sample rate (with default value of 2), and $\delta$ is given by:

$$\delta(n_s > 1) = \begin{cases} 1 & \text{if } n_s > 1 \\ 0 & \text{if } n_s = 1 \end{cases}.$$

The final error signals are $e_x^t = x_2$, $e_y^{\prime t} = y_2$.

As previously noted, the mapping of the posterior probabilities for the current image frame of data into prior probabilities for the next image is the mechanism by which the dynamic inter-frame processes (including the various noise sources such as sensor, noise, medium-related scintillation, and target reflection "speckle") are determined such that they can be accounted for. This approach is in contrast to the prior art approach of direct spatial averaging of image data, wherein a single frame of data at a time is processed in order to extract the target location. As result, the extracted target locations obtained using the present methodology are significantly more accurate, since contamination by the aforementioned sensor-based and medium-induced noise sources is substantially removed.

In an alternate embodiment of the image processing methodology of the invention, the mean $\Delta\alpha$ used in step 242 is replaced by a factor of $ge^{t-1}$. Specifically, this embodiment assumes the presence of a control system integrator (not shown) that updates the actuator 108 (mirror) position through $m^{t-1} = m^t + ge^t$, wherein g is the integrator gain. Another alternative embodiment, the control commands $m^t$ can be used in place of the actuator position $\alpha^t$. Note that the amount of tilt difference in the current image and the subsequent image due to the control system is given by $m^{t+1} - m^t = ge^t$. The actuator response time is typically much faster than the system sample rate, and hence $m^t$ is almost the same as the actuator position $\alpha^t$ previously discussed.

In another embodiment, the shifting methodology of step 242 is modified. Instead of shifting the prior probability by $\Delta\alpha$, the prior is rather updated according to Eqn. (26):

$$\pi^{\prime+} = G(\tau, 0) * \pi^t \qquad \text{Eqn. (26)}$$

and the preprocessed image is shifted by either $ge^{t-1}$ or $\Delta\alpha$ using interpolation and extrapolation.

In another embodiment, the application of smoothing and shifting is modified. Instead of smoothing and shifting the prior probability, the posterior is updated according to Eqn. (13) with the mean $\Delta\alpha$ being replaced by the factor of $ge^t$.

Figure 3A:
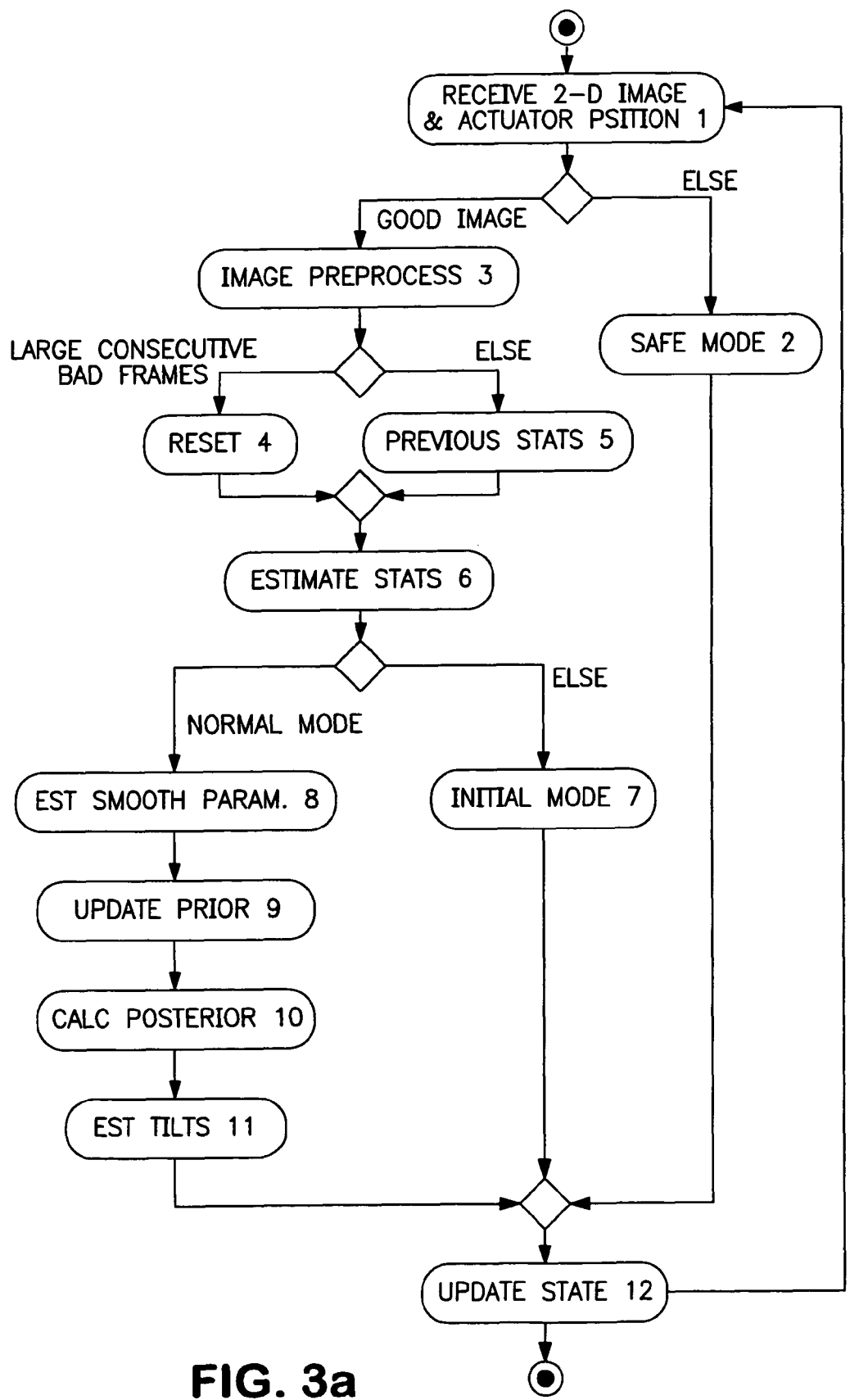
FIG. 3a is a logical flow diagram illustrating one exemplary embodiment of computer-based algorithms useful in implementing the methodologies of the invention.

FIG. 3a illustrates an exemplary embodiments of computer-based algorithms used to implement the various methodologies and functions of the present invention, respectively. It will be appreciated that while these computer algorithms are cast in terms of a collection of interrelated functional modules or logical processes of one or more computer programs, such features and structure are merely exemplary.

In another aspect of the invention, the foregoing algorithms (or more broadly, the various methodologies described previously herein) may be rendered as one or more computer programs. For example, in one embodiment, the computer program is written using a Matlab environment and includes various modules to perform the required processing functions. For example in one embodiment, the computer program comprises a C-based program having (i) a first module configured to scale the input image obtained at a first time, (ii) a second module configured to calculate the image statistics; (iii) a third module configured to calculate the smoothing parameter; (iv) a fourth module configured to perform shifting, calculate the posterior probability, as well as smoothing; a (v) module configured to determine the tilts (errors).

It will be recognized that the foregoing methodologies and apparatus provide a number of different inherent benefits and capabilities. Specifically, in one aspect, the foregoing methodology of generating the dynamic posterior probability allows for the identification of at least a portion of the motion of the target. Advantageously, this dynamic posterior will not converge to a fixed image, but rather will continue to move dynamically as the target moves and/or as the medium induces apparent motion via refraction of light waves.

Furthermore, the approach of segmenting an image into target and background classes of pixels allows for the isolation of scintillation noise (which is due to the medium's perturbation of the active illumination as it propagates from the platform to the target); i.e., the background pixels do not include scintillation information. Also, the processes of estimating and updating the image statistics for each of the pixel classes advantageously require no prior knowledge of any environmental property relating to the object or medium. These statistics can be estimated simultaneously with the posterior computation. While it is possible, and in some applications it may be desirable, to integrate knowledge of the medium into the estimation process, it has been noted by the inventor(s) hereof that in many settings, standard statistical estimation techniques produce excellent results.

Additionally, by generating a prior probability from a prior image and providing a smoothed posterior probability, the posterior probability can be corrected via shifting in order to effectively anticipate an image obtained during a subsequent time step. This anticipatory or "look ahead" capability significantly increases the accuracy of the tracking information generated by the system.

Integrated Circuit Device

Figure 4:
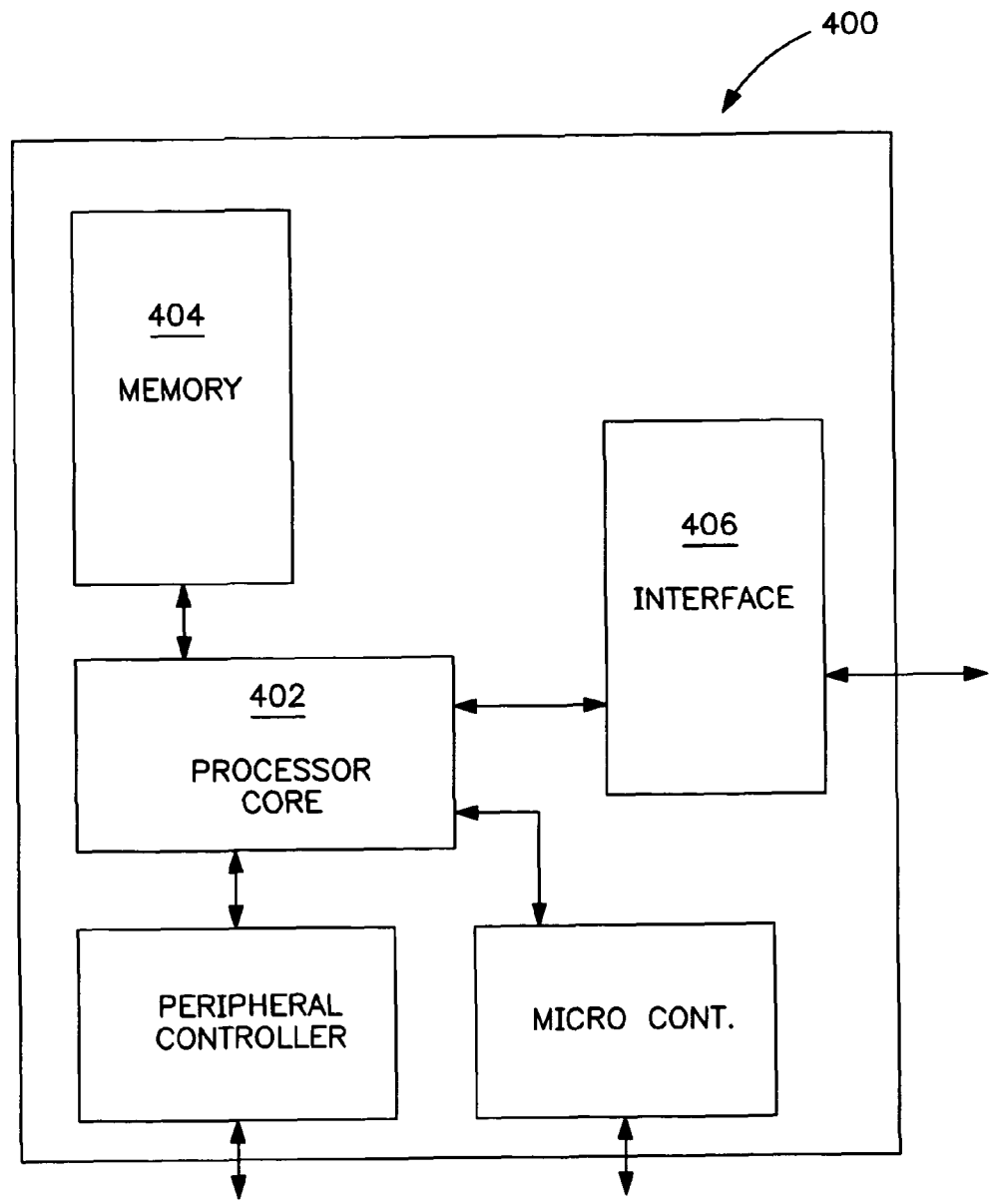
FIG. 4 is a functional block view of an exemplary integrated circuit (IC) according to the invention.

Referring now to FIG. 4, an exemplary integrated circuit useful for implementing the various image processing and tracking methodologies of the invention is described. As shown in FIG. 4, the integrated circuit 400 comprises a System-on-Chip (SoC) device having a high level of integration, and includes a microprocessor-like CPU device (e.g., RISC, CISC, or alternatively a DSP core such as a VLIW or superscalar architecture) having, inter alia, a processor core 402, on-chip memory 404, and an external data interface 406.

It will be appreciated by one skilled in the art that the integrated circuit of FIG. 4 may contain any commonly available peripheral such as serial communications devices, parallel ports, timers, counters, high current drivers, analog to digital (A/D) converters, digital to analog converters (D/A), interrupt processors, LCD drivers, memories, wireless interfaces such as those complying with the Bluetooth, IEEE-802.11, UWB, or other such standards, and other related peripherals, as well as one or more associated microcontrollers. Further, the integrated circuit may also include custom or application specific circuitry that is specifically developed to support specific applications (e.g., rapid calculation of "butterfly" calculations in support of the aforementioned FFT of step 242 of FIG. 2*a*). This may include, e.g., design via a user-customizable approach wherein one or more extension instructions and/or hardware are added to the design before logic synthesis and fabrication. For example, the approach disclosed in United States Patent Publication No. 20020194236 to Morris published Dec. 19, 2002 entitled "Data processor with enhanced instruction execution and method" which is incorporated herein by reference in its entirety, may be used consistent with the present invention to enhance FFT efficiency.

Available data or signal interfaces include, without limitation, IEEE-1394 (Firewire), USB, UARTs, other serial or parallel interfaces The processor and internal bus and memory architecture of the device 400 of FIG. 4 is ideally adapted for high-speed data processing, at least sufficient to support the requisite image processing and tracking tasks (see FIGS. 1*b*-2*c*) necessary to implement the present invention effectively in real time. This may be accomplished, e.g., through a single high-speed multifunction digital processor, an array of smaller (e.g., RISC) cores, dedicated processors (such as a dedicated DSP, CPU, and interface controller), etc. Myriad different IC architectures known to those of ordinary skill will be recognized provided the present disclosure.

It is noted that power consumption of devices such as that shown in FIG. 4 can be significantly reduced due in part to a lower gate count resulting from better block and signal integration. Furthermore, the above-described method provides the user with the option to optimize for low power. The system may also be run at a lower clock speed, thereby further reducing power consumption; the use of one or more custom instructions and/or interfaces allows performance targets to be met at lower clock speeds. Low power consumption may be a critical attribute for mobile image processing or object tracking systems, such as those mounted on airborne or autonomous platforms, or embodied in hand-held or field-mobile devices.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A method of estimating the position of a target with a tracking system using a sequence of images, comprising:

acquiring a multi-dimensional image from said tracking system for a time step t;

normalizing said image to produce a normalized image, said normalized image having an intensity within a given range;

super-sampling said normalized image with at least one sample rate to produce a super sampled image;

classifying said normalized image into target and background pixel sets;

determining at least one statistic of said pixel sets, said act of determining at least one statistic comprising:

updating for a plurality of prior time steps a temporal mean and standard deviation from said normalized image;

calculating from said temporal mean and standard deviation: (i) a target mean and standard deviation of all pixels in said target set, and (ii) a background mean and standard deviation of all pixels in said background set;

scaling the target and background mean standard deviation by a factor; and setting minimum and maximum bounds on said means and standard deviations;

smoothing a prior probability from a previous time step;

shifting the prior probability to produce an updated prior probability;

calculating a posterior probability using at least said updated prior probability; and extracting a position of said target for at least one time step using at least said posterior probability.

2. The method of claim 1, wherein said act of classifying comprises:

calculating an average image from said normalized image;

selecting said target pixel set from said average image, said target pixel set comprising a collection of pixels having an intensity larger than a predetermined value; and selecting said background set having at least first and second regions associated therewith, said selection of said background set being based at least in part on one or more pixels in said target pixel set.

3. The method of claim 1, wherein said act of smoothing further comprises estimating a smoothing parameter by at least:

estimating at least one open loop target position fluctuation by taking a difference between (i) a measured control position from a time step prior to t, and (ii) an error signal from a time step prior to t;

calculating for all time steps up to t at least one target position difference;

updating for a plurality of prior time steps a standard deviation from said target position difference; and scaling said standard deviation by a factor.

4. The method of claim 1, wherein said act of extracting a position comprises:

smoothing the posterior probability using a smoothing function to produce a smoothed posterior probability;

combining said smoothed posterior with said super-sampled image, to produce an intensity-weighted posterior probability;

generating an estimate of an initial component of the target position in a first dimension based at least in part on said intensity weighted posterior probability; and generating an estimate of an initial component of the target position in a second dimension based at least in part on said smoothed posterior probability.

5. A method of estimating the position of a target with a tracking system using a sequence of images, comprising:

acquiring a multi-dimensional image from said tracking system for a time step t;

normalizing said image to produce a normalized image, said normalized image having an intensity within a given range;

super-sampling said normalized image with at least one sample rate to produce a super sampled image;

classifying said normalized image into target and background pixel sets;

determining at least one statistic of said pixel sets;

smoothing a prior probability from a previous time step, said act of smoothing comprising:

estimating a smoothing parameter by at least:

estimating at least one open loop target position fluctuation by taking a difference between (i) a measured control position from a time step prior to t, and (ii) an error signal from a time step prior to t;

calculating for time steps up to t at least one target position difference;

updating for a plurality of prior time steps a standard deviation from said target position difference; and scaling said standard deviation by a factor;

shifting the prior probability to produce an updated prior probability;

calculating a posterior probability using at least said updated prior probability; and extracting a position of said target for at least one time step using at least said posterior probability.

6. The method of claim 5, further comprising acquiring a control position at said time step t;

wherein said act of shifting is based at least in part on said control position.

7. The method of claim 5 wherein said act of classifying comprises:

calculating an average image from said normalized image;

selecting said target pixel set from said average image, said target pixel set comprising a collection of pixels having an intensity larger than a predetermined value; and selecting said background set having at least first and second regions associated therewith, said selection of said background set being based at least in part on one or more pixels in said target pixel set.

8. The method of claim 5, wherein said act of extracting a position comprises:

smoothing the posterior probability using a smoothing function to produce a smoothed posterior probability;

combining said smoothed posterior with said super-sampled image, to produce an intensity-weighted posterior probability;

generating an estimate of an initial component of the target position in a first dimension based at least in part on said intensity weighted posterior probability; and generating an estimate of an initial component of the target position in a second dimension based at least in part on said smoothed posterior probability.

9. A method of estimating the position of a target with a tracking system using a sequence of images, comprising:

acquiring a multi-dimensional image from said tracking system for a time step t;

normalizing said image to produce a normalized image, said normalized image having an intensity within a given range;

super-sampling said normalized image with at least one sample rate to produce a super sampled image;

classifying said normalized image into target and background pixel sets;

determining at least one statistic of said pixel sets;
smoothing a prior probability from a previous time step;
shifting the prior probability to produce an updated prior probability;
calculating a posterior probability using at least said updated prior probability; and
extracting a position of said target for at least one time step using at least said posterior probability, said act of extracting a position comprising:
  smoothing the posterior probability using a smoothing function to produce a smoothed posterior probability;
  combining said smoothed posterior with said super-sampled image, to produce an intensity-weighted posterior probability;
  generating an estimate of an initial component of the target position in a first dimension based at least in part on said intensity weighted posterior probability; and
  generating an estimate of an initial component of the target position in a second dimension based at least in part on said smoothed posterior probability.

10. The method of claim 9, wherein said act of classifying comprises:
  calculating an average image from said normalized image;
  selecting said target pixel set from said average image, said target pixel set comprising a collection of pixels having an intensity larger than a predetermined value; and
  selecting said background set having at least first and second regions associated therewith, said selection of said background set being based at least in part on one or more pixels in said target pixel set.

11. The method of claim 9, wherein said act of determining at least one statistic comprises:
  updating for a plurality of prior time steps a temporal mean and standard deviation from said normalized image;
  calculating from said temporal mean and standard deviation: (i) a target mean and standard deviation of all pixels in said target set, and (ii) a background mean and standard deviation of all pixels in said background set;
  scaling the target and background mean standard deviation by a factor; and
  setting minimum and maximum bounds on said means and standard deviations.

12. The method of claim 9, wherein said act of smoothing further comprises estimating a smoothing parameter by at least:
  estimating at least one open loop target position fluctuation by taking a difference between (i) a measured control position from a time step prior to t, and (ii) an error signal from a time step prior to t;
  calculating for all time steps up to t at least one target position difference;
  updating for a plurality of prior time steps a standard deviation from said target position difference; and
  scaling said standard deviation by a factor.

13. A method of estimating the position of a target with a tracking system using a sequence of images, comprising:
  acquiring a multi-dimensional image from said tracking system for a time step t;
  normalizing said image to produce a normalized image, said normalized image having an intensity within a given range;
  super-sampling said normalized image with at least one sample rate to produce a super sampled image;
  classifying said normalized image into target and background pixel sets;
  determining at least one statistic of said pixel sets;
  smoothing a prior probability from a previous time step;
  computing a convolution kernel;
  shifting the prior probability to produce an updated prior probability using said convolution kernel;
  calculating a posterior probability using at least said updated prior probability; and
  extracting a position of said target for at least one time step using at least said posterior probability.

14. The method of claim 13, wherein said act of smoothing further comprises estimating a smoothing parameter by at least:
  estimating at least one open loop target position fluctuation by taking a difference between (i) a measured control position from a time step prior to t, and (ii) an error signal from a time step prior to t;
  calculating for all time steps up to t at least one target position difference;
  updating for a plurality of prior time steps a standard deviation from said target position difference; and
  scaling said standard deviation by a factor.

15. The method of claim 13, wherein said act of extracting a position comprises:
  smoothing the posterior probability using a smoothing function to produce a smoothed posterior probability;
  combining said smoothed posterior with said super-sampled image, to produce an intensity-weighted posterior probability;
  generating an estimate of an initial component of the target position in a first dimension based at least in part on said intensity weighted posterior probability; and
  generating an estimate of an initial component of the target position in a second dimension based at least in part on said smoothed posterior probability.

16. A method of estimating the position of a target with a tracking system using a sequence of images, comprising:
  acquiring a multi-dimensional image from said tracking system for a time step t;
  normalizing said image to produce a normalized image, said normalized image having an intensity within a given range;
  super-sampling said normalized image with at least one sample rate to produce a super sampled image;
  classifying said normalized image into target and background pixel sets;
  determining at least one statistic of said pixel sets, said act of determining at least one statistic further comprising:
    updating for a plurality of prior time steps a temporal mean and standard deviation from said normalized image;
    calculating from said temporal mean and standard deviation: (i) a target mean and standard deviation of all pixels in said target set, and (ii) a background mean and standard deviation of all pixels in said background set;
    scaling the target and background mean standard deviation by a factor; and
    setting minimum and maximum bounds on said means and standard deviations;
  smoothing a prior probability from a previous time step;
  shifting the prior probability to produce an updated prior probability;
  calculating a posterior probability using at least said updated prior probability; and
  extracting a position of said target for at least one time step using at least said posterior probability.

17. The method of claim 16, further comprising acquiring a control position at said time step t;
wherein said act of shifting is based at least in part on said control position.

18. The method of claim 16, wherein said act of classifying comprises:
calculating an average image from said normalized image;
selecting said target pixel set from said average image, said target pixel set comprising a collection of pixels having an intensity larger than a predetermined value; and
selecting said background set having at least first and second regions associated therewith, said selection of said background set being based at least in part on one or more pixels in said target pixel set.

19. The method of claim 16, wherein said act of smoothing further comprises estimating a smoothing parameter by at least:
estimating at least one open loop target position fluctuation by taking a difference between (i) a measured control position from a time step prior to t, and (ii) an error signal from a time step prior to t;
calculating for all time steps up to t at least one target position difference;
updating for a plurality of prior time steps a standard deviation from said target position difference; and
scaling said standard deviation by a factor.

20. The method of claim 16, wherein said act of extracting a position comprises:
smoothing the posterior probability using a smoothing function to produce a smoothed posterior probability;
combining said smoothed posterior with said super-sampled image, to produce an intensity-weighted posterior probability;
generating an estimate of an initial component of the target position in a first dimension based at least in part on said intensity weighted posterior probability; and
generating an estimate of an initial component of the target position in a second dimension based at least in part on said smoothed posterior probability.

21. A method of estimating the position of a target with a tracking system using a sequence of images, comprising:
acquiring a multi-dimensional image from said tracking system for a time step t;
normalizing said image to produce a normalized image, said normalized image having an intensity within a given range;
super-sampling said normalized image with at least one sample rate to produce a super sampled image;
classifying said normalized image into target and background pixel sets;
determining at least one statistic of said pixel sets;
smoothing a prior probability from a previous time step, said act of smoothing further comprising estimating a smoothing parameter by at least:
estimating at least one open loop target position fluctuation by taking a difference between (i) a measured control position from a time step prior to t, and (ii) an error signal from a time step prior to t;
calculating for all time steps up to t at least one target position difference;
updating for a plurality of prior time steps a standard deviation from said target position difference; and
scaling said standard deviation by a factor;
shifting the prior probability to produce an updated prior probability;
calculating a posterior probability using at least said updated prior probability; and
extracting a position of said target for at least one time step using at least said posterior probability.

22. The method of claim 21, further comprising acquiring a control position at said time step t;
wherein said act of shifting is based at least in part on said control position.

23. The method of claim 21, wherein said act of classifying comprises:
calculating an average image from said normalized image;
selecting said target pixel set from said average image, said target pixel set comprising a collection of pixels having an intensity larger than a predetermined value; and
selecting said background set having at least first and second regions associated therewith, said selection of said background set being based at least in part on one or more pixels in said target pixel set.

24. The method of claim 21, wherein said act of determining at least one statistic comprises:
updating for a plurality of prior time steps a temporal mean and standard deviation from said normalized image;
calculating from said temporal mean and standard deviation: (i) a target mean and standard deviation of all pixels in said target set, and (ii) a background mean and standard deviation of all pixels in said background set;
scaling the target and background mean standard deviation by a factor; and
setting minimum and maximum bounds on said means and standard deviations.

25. The method of claim 21, wherein said act of extracting a position comprises:
smoothing the posterior probability using a smoothing function to produce a smoothed posterior probability;
combining said smoothed posterior with said super-sampled image, to produce an intensity-weighted posterior probability;
generating an estimate of an initial component of the target position in a first dimension based at least in part on said intensity weighted posterior probability; and
generating an estimate of an initial component of the target position in a second dimension based at least in part on said smoothed posterior probability.

26. A method of estimating the position of a target with a tracking system using a sequence of images, comprising:
acquiring a multi-dimensional image from said tracking system for a time step t;
normalizing said image to produce a normalized image, said normalized image having an intensity within a given range;
super-sampling said normalized image with at least one sample rate to produce a super sampled image;
classifying said normalized image into target and background pixel sets;
determining at least one statistic of said pixel sets;
smoothing a prior probability from a previous time step;
shifting the prior probability to produce an updated prior probability;
calculating a posterior probability using at least said updated prior probability; and
extracting a position of said target for at least one time step using at least said posterior probability;
wherein said act of extracting a position comprises:
smoothing the posterior probability using a smoothing function to produce a smoothed posterior probability;
combining said smoothed posterior with said super-sampled image, to produce an intensity-weighted posterior probability;

generating an estimate of an initial component of the target position in a first dimension based at least in part on said intensity weighted posterior probability; and generating an estimate of an initial component of the target position in a second dimension based at least in part on said smoothed posterior probability.

27. The method of claim 26, further comprising acquiring a control position at said time step t;

wherein said act of shifting is based at least in part on said control position.

28. The method of claim 26, wherein said act of classifying comprises:

calculating an average image from said normalized image;

selecting said target pixel set from said average image, said target pixel set comprising a collection of pixels having an intensity larger than a predetermined value; and selecting said background set having at least first and second regions associated therewith, said selection of said background set being based at least in part on one or more pixels in said target pixel set.

29. The method of claim 26, wherein said act of determining at least one statistic comprises:

updating for a plurality of prior time steps a temporal mean and standard deviation from said normalized image;

calculating from said temporal mean and standard deviation: (i) a target mean and standard deviation of all pixels in said target set, and (ii) a background mean and standard deviation of all pixels in said background set;

scaling the target and background mean standard deviation by a factor; and setting minimum and maximum bounds on said means and standard deviations.

30. The method of claim 26, wherein said act of smoothing further comprises estimating a smoothing parameter by at least:

estimating at least one open loop target position fluctuation by taking a difference between (i) a measured control position from a time step prior to t, and (ii) an error signal from a time step prior to t;

calculating for all time steps up to t at least one target position difference;

updating for a plurality of prior time steps a standard deviation from said target position difference; and scaling said standard deviation by a factor.

* * * * *